United States Patent
Ozzie et al.

(10) Patent No.: US 8,073,905 B2
(45) Date of Patent: Dec. 6, 2011

(54) METHOD AND APPARATUS FOR MAINTAINING CONSISTENCY OF A SHARED SPACE ACROSS MULTIPLE ENDPOINTS IN A PEER-TO-PEER COLLABORATIVE COMPUTER SYSTEM

(75) Inventors: Jack E. Ozzie, Redmond, WA (US); Raymond E. Ozzie, Redmond, WA (US); Ransom L. Richardson, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 11/821,495

(22) Filed: Jun. 22, 2007

(65) Prior Publication Data

US 2007/0255787 A1 Nov. 1, 2007

Related U.S. Application Data

(62) Division of application No. 10/279,785, filed on Oct. 24, 2002, now Pat. No. 7,340,502.

(51) Int. Cl.
*G06F 15/16* (2006.01)
(52) U.S. Cl. ......................... 709/204; 709/205; 709/223
(58) Field of Classification Search .......... 709/204–207, 709/217–219, 223
See application file for complete search history.

(56) References Cited

U.S. PATENT DOCUMENTS

| | | | |
|---|---|---|---|
| 5,170,480 A | 12/1992 | Mohan et al. | |
| 5,787,262 A | 7/1998 | Shakib et al. | |
| 5,806,075 A * | 9/1998 | Jain et al. | 1/1 |
| 6,148,383 A * | 11/2000 | Micka et al. | 711/162 |
| 6,317,754 B1 | 11/2001 | Peng | |
| 6,327,671 B1 * | 12/2001 | Menon | 714/6 |
| 6,865,599 B2 | 3/2005 | Zhang | |
| 6,889,229 B1 | 5/2005 | Wong et al. | |
| 6,898,642 B2 | 5/2005 | Chafle et al. | |
| 7,587,467 B2 * | 9/2009 | Hesselink et al. | 709/214 |
| 2003/0167446 A1* | 9/2003 | Thomas | 715/513 |
| 2005/0144186 A1* | 6/2005 | Hesselink et al. | 707/101 |
| 2006/0031558 A1* | 2/2006 | Ortega et al. | 709/232 |
| 2008/0195689 A1* | 8/2008 | Newport et al. | 709/201 |

FOREIGN PATENT DOCUMENTS

WO    WO 01/06364 A2    1/2001

* cited by examiner

*Primary Examiner* — Faruk Hamza
(74) *Attorney, Agent, or Firm* — Wolf, Greenfield & Sacks, P.C.

(57) ABSTRACT

In a peer-to-peer collaboration system, deltas containing data change commands are organized in a persistent data structure called a delta log. The delta log is organized into blocks, which are the largest division in the delta log. In turn, blocks contain groups, groups contain chains and chains contain deltas. Delta blocks are used to implement priority deltas that are used to limit the collection of data change commands that must be transferred. Within a block the deltas are organized by groups, each of which is a set of deltas organized into chains. The delta group in used to determine which deltas to purge. The chains are ordered by increasing creator ID of the endpoint that created the chain. Organizing the delta log in this fashion allows the log to be "walked" to detect convergence problems. To achieve causality-preservation, each delta has a list of dependencies representing other deltas that must be executed before the current delta can be executed. The dynamics manager uses the ability to do (execute) and undo commands to perform roll back and roll forward operations on deltas in order to achieve convergence.

14 Claims, 26 Drawing Sheets

```xml
<g:LDel Done="" ReKeys="AQAAAUAAABfVEtJRA==">
  <g:Del CR="sb03AvDf" Gp="2" Seq="23787380EE817F97236F0013" Version="1,0,0,0">
    <g:Cmd Command="AddCommand" EngineURL="ToolContainer/3tb8a2vbubcjatfax2hi46mauamrs7ks9qmtj6i.Discussion.Tool/RecordSetEngine">
      <g:RecordWrapper _RecordID="438074781">
        <g:DiscussionRecord AttachmentNames="" AttachmentsID="-1" FileIcon="0" Subject="This is a discussion entry."
          _Created="1016639135649" _CreatedBy="Ransom5A"
          CreatedByURL="grooveIdentity://38z3cn7yn7i6wru5ejxufhyr458tx2yv@" _IsRead="0" _Modified="1016639135649"
          _ModifiedBy="" _NewParentID="-1" _ParentID="-1" _PreviousSiblingID="-1" _RecordID="438074781">
          <Body>
            <g:RichText Text="">
              <g:TextFontRuns>
                <g:TextFontRun Color="-9999997" End="1" Face="MS Shell Dlg" Flags="983040" LinkURL="" Size="655360" Start="0"/>
              </g:TextFontRuns>
              <g:TextParaRuns>
                <g:TextParaRun After="0" Base="1" Before="0" End="1" First="0" Flags="117440512" Left="0" Right="0" Start="0" Tabs =""/>
              </g:TextParaRuns>
            </g:RichText>
          </Body>
          <Attachments>
            <g:ShareDirectory>
              <g:Tree>
                <g:TreeNode/>
              </g:Tree>
              <g:CurrentDirectory FolderID="" UserURL=""/>
            </g:ShareDirectory>
          </Attachments>
        </g:DiscussionRecord>
      </g:RecordWrapper>
    </g:Cmd>
    <!--->
  </g:Del>
  <g:Sec KID="_TKID" KV="1"/>
</g:LDel>
```

FIG. 5

```
602 ─ <g:LDel Done="" ReKeys="AQAAAAUAAABfVEtJRA==" Ses="rANouB7PQb5BMLjV"/>
604 ─ <g:Del CR="XYKY9gEx" DepSeq="5278636452231D52D02D0002,843104C5529A3F38E1E70001" Gp="2"
           Seq="2378738DEE817F97236F0012" Version="1,0,0,0">
608 ─   <g:Cmds>
610 ─     <g:Cmd Command="0" EngineURL="ToolContainer/
            9exebdz8vca6b85mcg8cptgqtkrum69bhdmyq72.Sketchpad.Tool/SketchPadEngine"
            FullName="Ransom5A" UserID="Z+WQkeG6VENnNV0L"/>
612 ─     <g:Cmd Command="2" EngineURL="ToolContainer/
            9exebdz8vca6b85mcg8cptgqtkrum69bhdmyq72.Sketchpad.
            Tool/SketchPadEngine" Index="-1" PageID ="DefaultPage">
            <g:Item Date="20020320154532Z" FillColor="-9999998" ItemID="BjpLNKR9v7YSOICd"
            PenColor="-9999999" PenStyle="0" PenWeight="0" Primitive ="0" Rotation="0"
            ScaleX="1" ScaleY="1" UserID="Z+WQkeG6VENnNV0L">
              <g:Vertex X="211" Y="173"/>
              <g:Vertex X="797" Y="726"/>
            </g:Item>
          </g:Cmd>
        </g:Cmds>
      </g:CmdU>
614 ─   <g:Command Command="0" FullName="" UserID="Z+WQkeG6VENnNV0L"/>
      </g:CmdU>
616 ─   <g:Command Command="3" ItemID="BjpLNKR9v7YSOICd" PageID="DefaultPage"/>
      </g:CmdU>
    </g:Del>
606 ─ <g:Sec KID="_TKID" KV="1"/>
    </g:LDel>
```

*FIG. 6*

```
<g:LDel Done="" ReKeys="AQAAAAUAAABfVEtJRA==">
<g:Del CR="sb03AvDf" Gp="2" Seq="23787380EE817F97236F0018" Version="1,0,0,0">
<g:Cmds>
<g:Cmd CommandName="SetField" EngineURL
="ToolContainer/3tb8a2vbubcjatfax2hi46mau
amrs7ks9qmtj6i.Discussion.Tool/RecordSetEngine/_ComponentData/439061921"
FieldName="Subject" FieldValue="This is a discussion entry with an changed
subject." Modified="1016640492715" NOrd="0" Nested="E360A6C3B8E56952"/>
<g:Cmd CommandName="SetField" EngineURL
="ToolContainer/3tb8a2vbubcjatfax2hi46mauamr
s7ks9qmtj6i.Discussion.Tool/RecordSetEngine/_ComponentData/439061921"
FieldName="Body" Modified="1016640492762" NOrd="0" Nested="7E077E8DB14703D2">
<FieldValue>
<g:RichText Text="Now it has a body">
<g:TextFontRuns>
<g:TextFontRun Color="-9999997" End="19" Face="MS Shell Dlg" Flags="983040"
LinkURL="" Size="655360" Start="0"/>
</g:TextFontRuns>
<g:TextParaRuns>
<g:TextParaRun After="0" Base="1" Before="0" End="19" First="0" Flags="117440512"
Left="0" Right="0" Start="0" Tabs=""/>
</g:TextParaRuns>
</g:RichText>
</FieldValue>
</g:Cmd>
</g:Cmds>
```

*FIG. 8A*

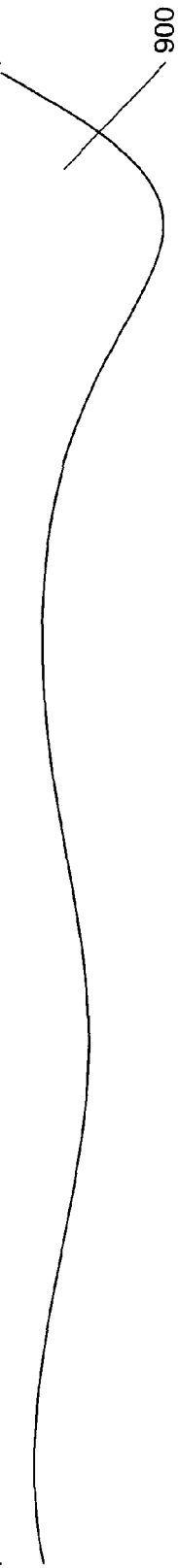

```
902 ─── <g:DelLog ActiveBlkNum="154" CZPDs="1" FirstBlkNum="114" PenGrpNum="316" PurGrpNum="4">
           ...
904 ─── <g:DelBlk DelSeq="E647F3878296437E33960001" HighGrpNum="370" NoUndo="">
906 ─── <g:DelGrp DoneTime="1015374180760" Number="368">
908 ─── <g:DelChn CreatorID="E647F3878296437E33960000">
910 ─── <g:LDel...
             </g:DelChn>
           </g:DelGrp>
912 ─── <g:DelGrp DoneTime="1015422825778" Number="369">
           <g:DelChn CreatorID="7EE89ED51ED9536D17EC0000">
             <g:LDel...
             <g:LDel...
             <g:LDel...
             </g:DelChn>
           <g:DelChn CreatorID="8DB63ECD2654359 37FD60000">
             <g:LDel...
             <g:LDel...
             <g:LDel...
             </g:DelChn>
           </g:DelGrp>
```

*FIG. 9A*

```
1402 ——— <g:Epts NDeps="28AE223CAED55FC8A1AD0002">
1404 ——— <g:Ept ContactURL="grooveIdentity://55veesabxb4kgkur5qqs88gkvwrd8quxqnk936b@"
              CreationId="First" DeviceURL="dpp://rcpnae1.groove.net/
              pb7mc8752wey7jcchp9zqy2rc6mxhctvx92k9ha" HGN="64"
              HIP="0000000040050AA36C1D70460A637000001" PurGrp="27" Reqs
              ="5B81DCFA324400000000000,C03EFBC1DF4A00000000000000,E8740068A10C000000000000" SPG="1"
              State="1" UID="50AA36C1D7040000">
1408 ——— <g:Creator HIP="0000000270050AA36C1D7044620220A70001" LastUID="3"/>
1410 ——— <g:Creator HIP="0000000030050AA36C1D7040121A0DC0008" LastUID="5"/>
1412 ——— <g:Creator HIP="0000000030750AA36C1D70458183AF10001"/>
1414 ——— <g:Creator HIP="0000000030950AA36C1D704577FA0940001"/>
1416 ——— <g:Creator HIP="0000000030F50AA36C1D7045E1E392D0001"/>
1418 ——— <g:Creator HIP="0000000040050AA36C1D70460A637000001"/>
          </g:Ept>
1406 ——— <g:Ept ContactURL="grooveIdentity://d3xj4ain9js5xsre4vymumnqccfvdqph@"
              CreationId="50AA36C1D7046B8956400001" DeviceURL
              ="dpp://rcpnae1.groove.net/hha7sq2592tyuk25d6dkmn7ir8jktxzi9ct4f5i" HGN="58"
              HIP="00000000D0D9519BD737000000000000" Invitor="50AA36C1D7040000" PurGrp
              ="27" SPG="54" State="0" UID="D0D9519BD7370000">
```

*FIG. 14A*

```
<g:LDel Done="">
  <g:Del CR="sb03AvDf" Gp="2" IdDiss="" SubSeq="237B7380EE817F97236F0017000000002"
    Version="1,0,0,0">
    <g:Cmd Command="MarkReadCommand" ContextHash="235510903" EngineURL
      ="ToolContainer/3tb8a2vbubcjatfax2hi46mauamrs7ks9qmtj6i.Discussion.Tool/
      rdSetEngine" Value="1" _RecordID="439061921"/>
    <g:CmdUGrp>
      <g:CmdU/>
    <g:NDel CR="sb03AvDf" DelId="237B7380EE817F97236F001700000021973447561" Done="">
      <g:Cmd CommandName="SetField" EngineURL
        ="ToolContainer/3tb8a2vbubcjatfax2hi46mauamrs7ks9qmtj6i.Discussion.Tool/
        rdSetEngine/_ComponentData/439061921" FieldName="_IsRead"
        FieldValue="1" Modified="1016640362793"/>
      <g:CmdU IsFieldNew="0" OldFieldValue="0"/>
    </g:NDel>
  </g:CmdUGrp>
  </g:Del>
  <g:Sec/>
</g:LDel>
```

*FIG. 16*

METHOD AND APPARATUS FOR MAINTAINING CONSISTENCY OF A SHARED SPACE ACROSS MULTIPLE ENDPOINTS IN A PEER-TO-PEER COLLABORATIVE COMPUTER SYSTEM

CROSS-REFERENCE TO RELATED APPLICATIONS

This application claims the benefit as a divisional application of U.S. patent application Ser. No. 10/279,785 filed on Oct. 24, 2002 and entitled "METHOD AND APPARATUS FOR MAINTAINING CONSISTENCY OF A SHARED SPACE ACROSS MULTIPLE ENDPOINTS IN A PEER-TO-PEER COLLABORATIVE COMPUTER SYSTEM," which is incorporated herein by reference in its entirety.

FIELD OF THE INVENTION

The invention relates to peer-to-peer collaborative computer systems that directly exchange command and data blocks in order to maintain consistency of a shared space among the collaborators.

BACKGROUND OF THE INVENTION

Collaboration involves the ability for each member in a group of members, called "collaborators" to automatically transmit information to, and receive information from, other collaborators in the group. In order to facilitate such collaboration, various systems have been developed that allow such information to be transmitted between personal computer systems, communication appliances or other communication devices, including handheld and wireless devices. Collectively, these devices will be referred to a "computers" in this description.

Computer-based collaboration may occur locally among users connected to, or operating with, one computer or server. Alternatively, collaboration may occur over a network, such as the Internet, wherein each of the users is located at a computer connected to the network. A server may also be connected to the network. Several collaboration models are currently being implemented as networked computer collaboration systems. One of these models is a client-server model in which all collaborators are connected, via the network, to a central server. Information generated by each collaborator is sent over the network to the server that then broadcasts the information back over the network to each other collaborator. Another model is a "peer-to-peer" model in which direct connections are established over the network between each of the collaborator computers. Information generated by each collaborator is then sent directly to each other collaborator. In such a system, the collaborators communicate in a private "virtual" shared space.

In both of these models, there are several methods by which information is transferred between collaborators. For example, in a client-server system, data that is being collaboratively modified may be stored on the server. Then, each collaborator that wants to modify the data sends a command to the server to effect a change in the server data. The server modifies its copy of the data and then sends information representing a "view" of the modified data to all collaborators, so that each collaborator can display the data locally.

A central data repository is not possible in a peer-to-peer collaboration system because no collaborator acts as a server. Thus, in such systems, each collaborator has a local copy of the data being collaboratively modified. In order to change the data, a collaborator generates a data change request that is forwarded to each other collaborator. The incoming data change requests are then used by each collaborator to modify its local data copy.

The latter type of collaboration system is described in detail in U.S. patent application Ser. No. 09/357,007 entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930 entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie; U.S. patent application Ser. No. 09/356,148 entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie and U.S. patent application Ser. No. 09/588,195 entitled METHOD AND APPARATUS FOR EFFICIENT MANAGEMENT OF XML DOCUMENTS, filed Jun. 6, 2000 by Raymond E. Ozzie, Kenneth G. Moore, Ransom L. Richardson and Edward J. Fischer.

In this collaboration system, each collaborator has a program called an "activity", that is operable in his or her computer. The activity program contains a tool that responds to user interactions by generating data change commands. These data change commands are provided to a data-change engine that maintains the local data copy by performing the changes to the data requested by the data change commands. The commands are inserted into a container called a "delta" and deltas are distributed from one collaborator to another by a program called a communications manager.

When a peer-to-peer collaboration system is used over a network, special considerations must be addressed. A major consideration is network latency. In particular, when a delta is transmitted over the network to a group of other collaborators, it may reach some collaborators sooner than others due to unequal transit times over the network. Since all collaborators send and receive deltas "asynchronously", the requests may be received by different collaborators in different orders. This can potentially create a problem because the correct execution of some commands may depend on other commands having been previously executed. In order to ensure that the local data copies remain consistent, the collaboration system must preserve causality. Specifically, causality demands that, when a current data change command received from a first collaborator is executed by a second collaborator, the second collaborator will have executed all previous data change commands that the first collaborator had executed when the current data change command was created.

Another condition that must be satisfied is convergence. Convergence ensures that when all collaborators have executed the same set of operations, the final execution order of data change commands by all collaborators is the same. In the collaboration system described in the aforementioned patent applications, a special program in each computer called a dynamics manager receives and interprets the deltas generated in that computer and received by that computer from other computers in order to preserve causality and to ensure convergence.

Another potential problem in a peer-to-peer system concerns collaborators entering and leaving the collaboration group during an on-going session by disconnecting their computers from the network or powering down the computers. Since the integrity of a collaborator's local data copy depends on receiving data change commands from other collaborators and correctly interpreting these commands, collaborators who leave a collaboration session will need either a complete current copy of the local data or a collection of data change commands that were transmitted by other collaborators during their absence in order to restart their system. In many cases, the copy of the local data and the collection of data change commands can be quite large resulting in a lengthy startup delay for a collaborator entering an ongoing collaboration session.

SUMMARY OF THE INVENTION

In accordance with the principles of the invention, deltas are organized in a persistent data structure called a delta log. The delta log is organized into blocks, which are the largest division in the delta log. In turn, blocks contain groups, groups contain chains and chains contain deltas. Delta blocks are used to implement priority deltas that are used to limit the collection of data change commands that must be transferred. Within a block the deltas are organized by groups, each of which is a set of deltas organized into chains. The delta group in used to determine which deltas to purge. The chains are ordered by increasing creator ID of the endpoint that created the chain. Organizing the delta log in this fashion keeps the deltas in a consistent order on all endpoints. This makes it possible to "walk" the delta log to achieve convergence on all endpoints.

To achieve causality-preservation, each delta has a list of dependencies representing other deltas that must be executed before the current delta can be executed. The dynamics manager uses the ability to do (execute) and undo commands to perform roll back and roll forward operations on deltas in order to achieve convergence.

In order to prevent the delta log from growing too large, a purging technique in accordance with the principles of the invention uses endpoint pulses transmitted between the endpoints in a shared space. Each endpoint includes in an endpoint pulse information identifying a delta group that it is willing to purge (based on the highest group that each endpoint has acknowledged receiving). Then, all endpoints purge deltas in groups selected by comparing the groups that the endpoints have declared that they are willing to purge.

In accordance with another embodiment, special deltas called priority deltas are used to control the execution ordering of independent deltas. For example, a delta inviting an endpoint to a shared space can be a priority delta so that deltas independent with the invite delta do not cause a rollback necessary to achieve convergence and, therefore, it is not necessary to send the contents of the entire delta log to a new invitee.

In accordance with yet another embodiment, special deltas called asynchronous deltas are used to transmit large files without blocking the transmission of other deltas during the file transfer process. Asynchronous deltas are arranged so that they do not have other deltas that are dependent on them. Accordingly, endpoints do not need to wait until processing of an asynchronous delta is finished in order to transmit other deltas.

In accordance with yet another embodiment, persistent data is kept representing the state of all endpoints in the shared space. Deltas are only sent to active endpoints and the processing of inbound deltas depends on the state of the endpoint that sent the delta. These states support the implementation of membership changes, such as invite and uninvite, in a decentralized and secure fashion. In addition, it is possible to suspend an inactive endpoint in the shared space to allow portions of the delta log to be purged.

BRIEF DESCRIPTION OF THE DRAWINGS

The above and further advantages of the invention may be better understood by referring to the following description in conjunction with the accompanying drawings in which:

FIG. 5 is a diagram illustrating an XML data structure that represents a typical delta with one data change command and no undo information.

FIG. 6 is a diagram illustrating the XML data structure that represents a typical delta with two data change commands and undo information for both commands.

FIGS. 8A and 8B, when placed together, form a diagram of an XML data structure of a delta that contains two creation nested deltas, both of which have undo information.

FIGS. 9A and 9B, when placed together, form a diagram of an XML data structure of a delta log that holds deltas during processing.

FIGS. 14A and 14B, when placed together, form a diagram representing an XML data structure for storing endpoint information.

FIG. 16 is a diagram showing an illustrative XML data structure of an identity disseminated delta.

DETAILED DESCRIPTION

Figure 1:
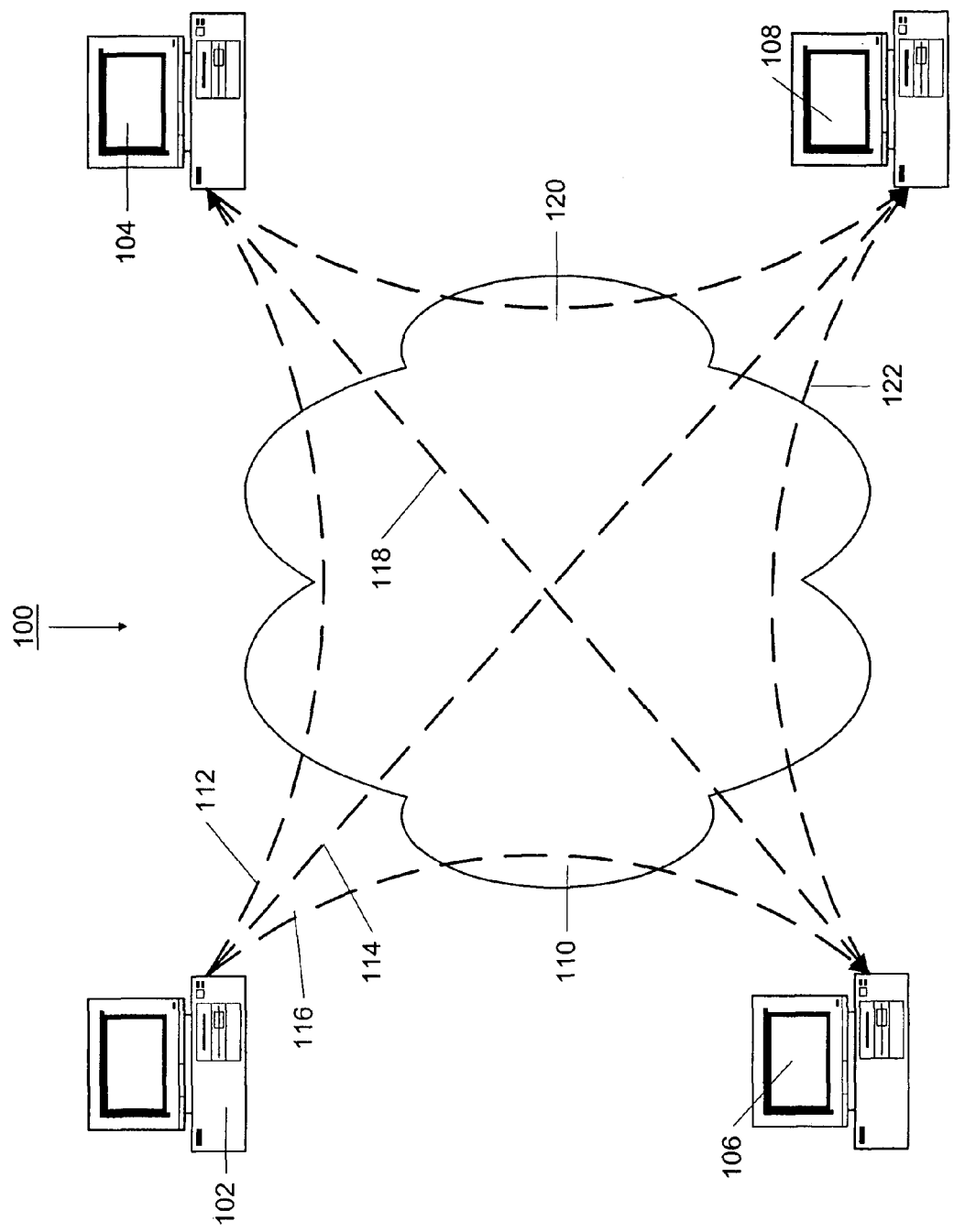
FIG. 1 is a block schematic diagram of an illustrative prior art collaboration system on which the invention can be used.

FIG. 1 illustrates, in a very schematic form, a peer-to-peer collaboration system 100 in which collaborating computers are connected to each other by a network 110, such as the Internet. Although various networks can be used with such a system, in the discussion below, the network 110 is assumed to be the Internet. In this system, the collaborating computer systems constitute peer units 102-108, and communications through the Internet 110 can be directed from one peer unit to another, without intermediaries. Each peer unit 102-108 can be implemented as a personal computer or other form of network-capable device, such as a set top box or hand-held device.

Peer-to-peer communications can be made directly between peer units. For example, peer unit 102 may communicate directly with peer units 104, 106 and 108, as indicated schematically by dotted links 112, 116 and 114, respectively. In a similar manner, peer unit 104 can connect to units 108 and 106 via connections 120 and 118, respectively. Finally, units 106 and 108 can communicate over connection 122. A collaboration system such as that shown in FIG. 1 is available from Groove Networks, Inc., 100 Cummings Center, Suite 535Q, Beverly, Mass. 01915 and is described in detail in the Groove™ Platform Development Kit which is available from Groove Networks, Inc. In the discussion below, the collaboration system will be assumed to be such a system. However, it will be apparent to those skilled in the art that other collaboration systems could also be used with the present invention.

In this collaboration system, a program called an "activity" is resident in each collaborating computer system, communication appliance or other network-capable device. The activity allows a shared, focused task, such as, for example, a "chat", gaming, or business application, to be performed in collaboration with other, remotely-located collaborators. This collaboration involves shared and mutual activities between individuals and small groups in private shared spaces. Each shared space is an instantiation of one or more activities operable on each of the collaborating computers of members of that shared space.

In the system, participants or members of a shared space access the system by opening "accounts" that are associated with "endpoints." Since an individual collaborator may access the system via more than one device, an endpoint is defined as a unique combination of an individual and a device. Each endpoint stores an individual, local copy of the shared space data.

Each activity includes one or more tools, each of which interacts with a collaborator, for example, by receiving mouse and keyboard events, and initiates data change requests in response to the interactions. These data change requests are used locally and sent to other members of the shared space. Each activity also includes one or more data-change engines, separate from the tools, for maintaining the local copy of the shared space data pursuant to a common data model. The data model is, for example, activity-specific, and preferably the same over all members of the shared space. Each collaborating computer also includes a dynamics manager, that examines data change requests generated locally and received from other shared space members and coordinates the execution of the local and other data change requests and directs the data-change engine to make the requested changes to the local copy of data.

Figure 2:
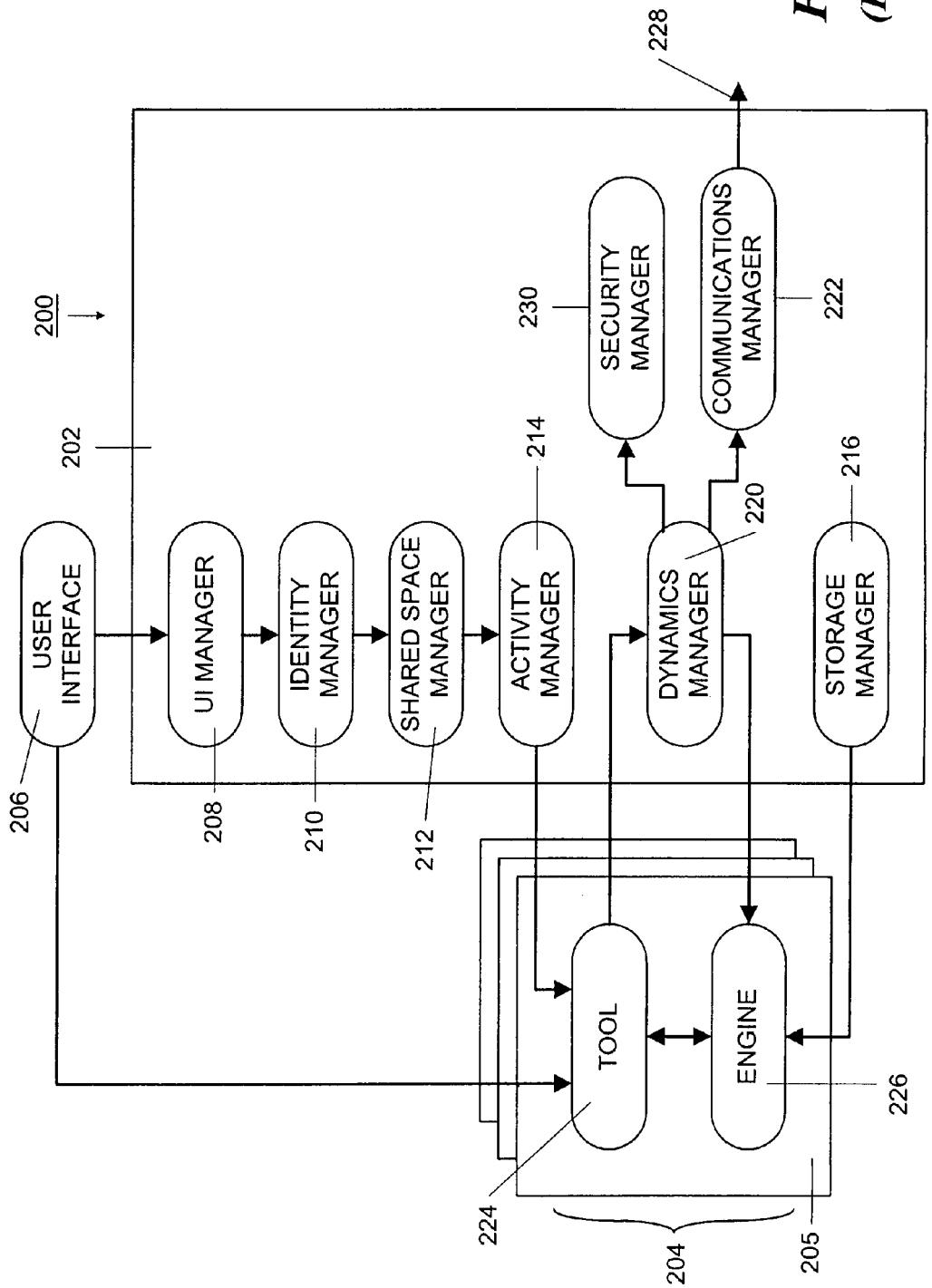
FIG. 2 is a more detailed block schematic diagram of an illustrative prior art computer system running collaboration software used to implement the system shown in FIG. 1.

FIG. 2 shows, in more detail, the internal architecture 200 of the collaboration system as implemented on one of the peer units 102-108, such as, for example, peer unit 102. The collaboration system on peer unit 102 includes a framework 202, at least one shared space 204 instantiating one or more activities 205, and a user interface 206.

The framework 202 can provide a platform for servicing a number of shared spaces, of which shared space 204 is shown. The framework 202 preferably is of modular construction, with an application programming interface (API) on which the activities run and through which they communicate with framework components. The framework 202 includes a user interface manager 208, an identity manager 210, a shared space manager 212, an activity manager 214, a storage manager 216, a dynamics manager 220, and a communications manager 222.

The user interface (UI) manager 208 is responsible for managing shared services for a number of user interface controllers (not separately shown). The UI manager 208 manages the graphical layout of activity screen displays within panes of a display window, and otherwise provides a desired "look and feel" for the user interface. The UI manager 208 also manages activity navigation (for example, go to, next, previous, etc.) and maintains a navigation history.

The identity manager 210 is responsible for maintaining an "identity" for each shared space member. An identity is the name, and corresponding uniform resource locator (URL), by which each user is known by others. Individual users may have one or many identities. The identity manager 210 maintains a record or table, in the local storage of the identities. The identity manager 210 can also maintain a record or table of URLs for the shared space members and their corresponding device URLs. Alternatively, a separate member manager can be implemented.

The shared space manager 212 is responsible for managing each of the shared spaces 204 that may be opened on the peer unit 102. Each shared space 204 is an instantiation of one or more activities. Each shared space 204 has a corresponding activity manager 214.

Each activity manager 214 is responsible for (a) adding new activities to a shared space, (b) opening existing activities in a shared space, and (c) updating shared space activities. Each activity is defined by an activity "template" that defines the initial activity configuration for a shared space and is a persistent representation of the tool and engine components comprising the activity. In order to create an activity template, a software developer may write a tool or adapt an existing tool and engine for use within the framework. For example, an activity template can be distributed as shrink-wrapped software or downloaded over the Internet to peer unit 102 from a remote server. Activity components can be regarded as Web documents and are represented persistently via URLs. The activity template itself preferably has a URL, which allows for tracking activity design changes. The activity template can be a single activity template or an activity collection template. A single activity template pertains to only one activity, such as "chat". An activity collection template pertains to a collection of activities, such as "chat and outline".

To add a new activity, the activity manager 214 is provided by the means described above with the URL of a template for the new activity. In order to open the new activity or an existing activity, the activity manager opens the template, extracts the template information (such as component URLs) and propagates the information into the shared space. A collaborator may add additional activities to the shared space 204 as needed. After being added, an activity is "part of" the shared space and visible to all shared space members and each shared space member has an activity template for the shared space available on his or her peer unit.

Each shared space, such as shared space 204 has a tag to identify its corresponding activity manager 214 and to bind the activity manager with data associated with the activity. Preferably, the data is located in a document in the local memory and each document has a local registry linked to it with tag names maintained in the registry to express a mapping (reference pointers or associations) in an extensible, platform-independent way, between the document and its corresponding shared space.

Each activity, such as activity 205, includes a tool, such as tool 224 and an engine, such as engine 226. The tool 224, in conjunction with the user interface 206, allows an activity to interact with a collaborator. For example, the tool may receive user interface events, such as keyboard or mouse events, generated when the user interacts with the user interface 206. In response to such user interface events, the tool 224 may make data change requests to its corresponding engine 226. Tool 224 also implements APIs for interacting with background services.

The engine 226 is responsible for maintaining and changing the data that supports the shared space 204 and/or results from user interaction obtained through the tool 224. It responds to data change requests from tool 224 by returning to the tool 224 commands necessary to implement the data change requests. Under the direction and control of the dynamics manager 220, the engine 226 can make changes to the shared space data copy that is stored locally under control of the storage manager 216. When these changes are made, the engine 226 asynchronously generates data change notifications. The tool 224 can subscribe to the engine 226 to receive these data change notifications so that the tool 224 can update the user interface asynchronously when the data changes occur.

The dynamics manager 220 receives local data change commands from the tool 224 and receives data change commands from other collaborating computers, via communication manager 222 from a network connection 228. These commands may be encrypted for transmission between collaborators and the dynamics manager 220 can use security manager 230 to decrypt the commands. Dynamics manager 220 makes decisions on which commands to implement in order to maintain synchronization among all collaborators and forwards these commands to engine 226 in order to cause engine 226 to make changes to the local data copy.

During operation the collaborative system 200 obtains a member's identity from the identity manager 210 and opens a shared space manager 212. The system 200 then requests that the shared space manager 212 open a shared space identified via a URL and create an activity manager 214. Once created, the activity manager 214 opens an activity, typically by using the activity's URL to identify the activity. Then, the collaboration system 200 is ready for members to use the shared space to perform the shared, focused tasks offered by the particular activity.

As previously mentioned, data change requests generated by the engine 226 are placed into a container called a "delta" that is used to send to the data change requests to other collaborators. In the illustrative collaboration system, a delta is an atomic unit of change in a shared space and is the only way to make shared space changes that affect multiple endpoints. The dynamics manager 220 in each endpoint is responsible for making sure that the data change commands in each delta are correctly executed so that the ordering of the data change commands is consistent on multiple endpoints in a shared space. In order to do this, the dynamics manager 220 works with various engines 226 to execute and "undo" data change commands.

The dynamics manager provides a number of frameworks that handle various services necessary to ensure the aforementioned causality preservation and convergence. These frameworks include a Command Execution framework, an Advise framework, a Distribution framework and a Delta Log management framework.

To achieve causality-preservation each delta has a list of dependencies representing other deltas that must be executed before the current delta can be executed. The dynamics manager uses the ability to do (execute) and undo commands to perform roll back and roll forward operations on deltas in order to achieve convergence. If two endpoints A and B independently generate and execute deltas DA and DB, respectively, and send the deltas to the other endpoint, then one endpoint will have to "rollback" its delta execution in order for both endpoints to converge. For example, on endpoint A, delta DA will be executed before delta DB is received. On endpoint B, delta DB will be executed before delta DA is received. In order to ensure convergence, one endpoint will need to rollback. If the correct execution order determined by the dynamics manager is Do(DA) Do(DB), then endpoint B will need to perform a rollback. The order of operations on B will be: Do(DB) Undo(DB) Do(DA) Do(DB). Thus, the final order of execution will be the same on both endpoints.

As part of the command execution framework, the dynamics manager 220 also provides handling for exceptions that occur when commands are executed. The dynamics manager 220 also provides APIs to allow tools to execute user level undo and redo operations. The dynamics manager 220 uses the same undo and redo implementation used by rollback and rollforward operations to support the user undo and redo operations.

The dynamics manager also places restrictions on operation that can be performed by engines as part of do and undo methods. In particular, the engines can not call any higher level components (such as views) during these methods. In order to help engines implement view notifications, the dynamics manager 220 provides an asynchronous notification service in connection with "advise" elements. These elements are provided to the dynamics manager 220 and the dynamics manager 220 then asynchronously notifies any entity that is registered to receive those notifications. The notifications are also used for the notification of events other than the execution of a command.

The dynamics manager 220 is further responsible for guaranteeing that deltas are sent and received by all active endpoints in the shared space. In order to do this, the dynamics manager 220 maintains contact information for all endpoints in the space. Deltas that are executed locally are also disseminated to all members of the space to be executed on other endpoints. Typically, the communications network between endpoints is not fully reliable and, thus, the dynamics manager 220 is responsible for re-transmitting deltas that may have been lost during transmission. The dynamics manager 220 uses the dependencies on deltas to detect when deltas are missing. The dynamics manager 220 also periodically sends pulses when there have been changes in the shared space. Like deltas, the pulses contain dependencies that can be used to detect missing deltas.

Once the dynamics manager 220 detects that a delta is missing, it normally attempts to fetch the missing delta from one or more other endpoints in the shared space. The deltas are stored in a data structure called a delta log in each endpoint so that other endpoints can normally satisfy the request and resend the missing delta. The dynamics manager 220 also exposes an interface to allow others to disseminate information to the endpoints in a shared space.

The dynamics manager 220 maintains the aforementioned delta log that contains all of the deltas that have been executed in the space. The log is kept for three reasons: the deltas may need to be rolled back to ensure convergence, the deltas may need to be fetched by another endpoint and the deltas may be undone or redone by the user. The dynamics manager 220 detects when a delta no longer needs to be kept for any of these reasons. At that time, the dynamics manager 220 may remove the delta from the delta log in a process called purging. In order for the dynamics manager 220 to detect that it no longer needs a delta, it must receive pulses from all of the other endpoints. If an endpoint doesn't send a pulse for predetermined time period, the dynamics manager 220 may decide that the endpoint is a "laggard." A laggard endpoint is defined as an endpoint that appears to have lost connection with the shared space. Generally, it is desirable to temporarily remove such an endpoint from the space so that its deltas can be purged from the delta log in order to reduce the size of the delta log. If other endpoints also decide that an endpoint is a laggard, then the laggard endpoint is disconnected from the shared space. If the laggard endpoint becomes active in the shared space again, it will need to receive a new copy of the space from one of the active endpoints.

Figure 3A:
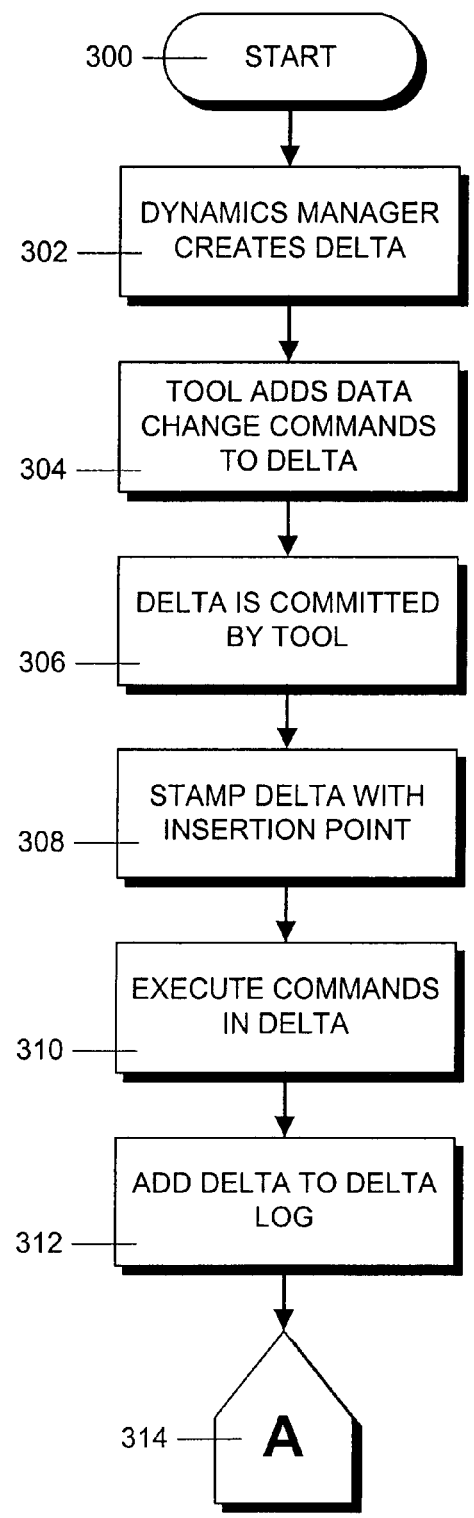
FIGS. 3A and 3B, when placed together, form a flowchart that illustrates the steps in processing a delta on the endpoint that created the delta in accordance with the principles of the invention.
Figure 3B:
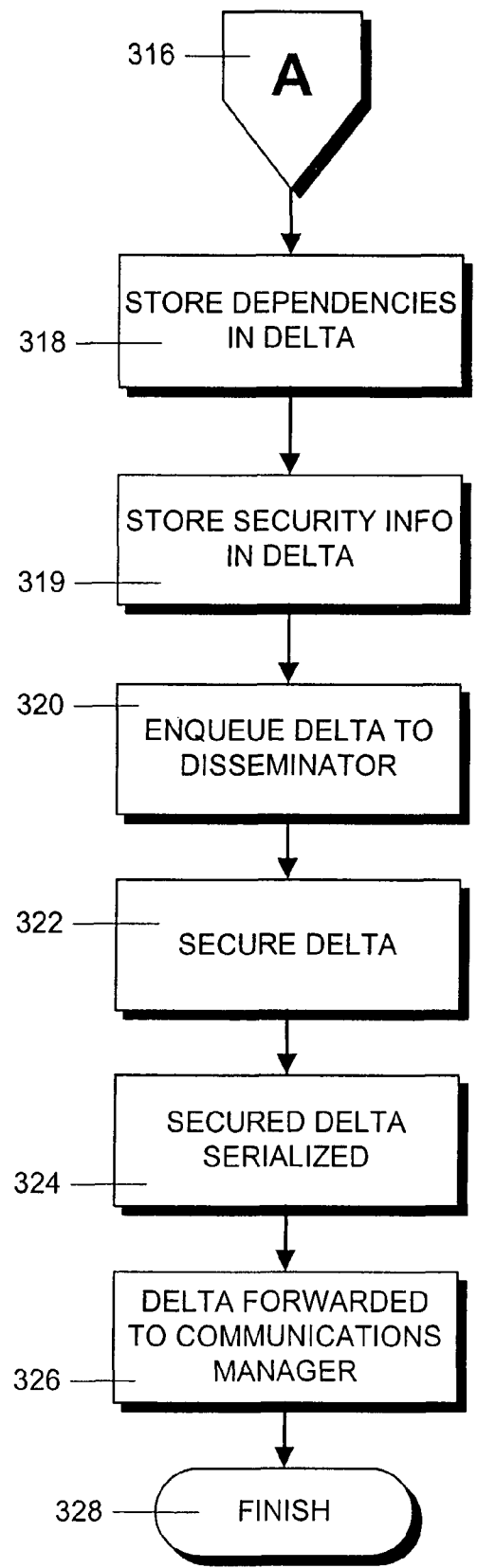

There are several steps involved in the process of creating and executing data change commands in deltas, and many components of the collaborative system are involved in this process. FIGS. 3A and 3B, when placed together, form a flowchart that illustrates the major steps involved in creating a delta and inserting the delta into a shared space. This flowchart is described in connection with FIG. 4 that illustrates the major components involved in the process, including components at the source endpoint from which the delta is generated and a destination endpoint to which the delta is sent.

The process starts in step 300 and proceeds to step 302 where a dynamics manager, such as manager 420, in a source endpoint 400 (the endpoint that creates the delta) creates a delta at the request of a tool 418. The dynamics manager 420 represents the delta using XML code. A newly created delta is an empty container for data change commands. The structure of a typical delta varies depending of the type of delta, the number of commands contained in the delta and whether "undo" information allowing the commands to be "undone" is present. FIG. 5 shows the basic XML code structure of a delta 500 with one command and no undo information and FIG. 6 shows the basic XML code structure of a delta 600 with two commands and undo information for both commands. In accordance with typical XML structure, this XML code consists of a plurality of hierarchical elements that are nested with each other. Each element may have attributes associated with it and specific content. All the XML code is in a namespace where "g" stands for the URL "urn:groove.net".

The LDel element 502, 602 is a local delta element and has attributes that are relevant to the local endpoint only. For that reason this delta element is not sent to other endpoints when the deltas is sent to other endpoints. It has several attributes. Attributes are only included in an element if they are relevant so not all attributes are shown in FIGS. 5 and 6. The LDel element 502, 602 attributes include an AssPrevGenDel attribute that is set when the delta is associated with a previous delta for undo purposes (that is the deltas will be undone together). The BlkDel attribute this is set when this delta has the highest priority in the current block. The DeltaToRedoIP attribute is set on a redo delta. It is set to the insertion point of the delta that is being redone. The DoError attribute is set when there was an error the last time the delta was executed. The Done attribute is set when the delta has been executed on the endpoint. It doesn't exist if the delta has not been executed. The Redone attribute is set when the delta has been undone and then redone. The ReKeys attribute contains key information for the delta that is used in encrypting the delta to send to other endpoints. It only exists on the endpoint that is the creator of the delta. The SenderUID attribute is set to the unique ID of the sender endpoint on deltas that were received as the result of a fetch request by the dynamics manager 420.

The Ses attribute is the delta session used in undo and redo operations. It only exists on the endpoint that generated the delta. The Undo attribute is set when the delta is an undo delta. The UndoError attribute is set when there was an error the last time an attempt was made to undo the delta. The Undone attribute is set when a delta has been undone. The URL attribute stores a URL if one was specified for the delta. This URL is used as the message URL and allows the dynamics manager to support delta progress notifications.

The content of the LDel element 502, 602 include the Del element 504, 604 and the SEC element 506, 606. The Del Element 504, 604 is the delta element that is sent to other endpoints. Note that only the command element (or commands element) is disseminated. Any command undo information is not disseminated. The Sec element 506, 606 is the security element where the security manager 414 can store delta-specific security information.

The attributes of the Del element 504, 604 include an AddEpt attribute that is set when this delta adds an endpoint to the shared space. An AddNewEpt attribute is set when this delta adds a new endpoint to the shared space. This attribute is only used when an account space is imported on a new device. A CR attribute holds the conflict region of the delta that is set when the delta is created. Deltas that have different conflict regions do not require a consistent order of execution. Deltas with no conflict region conflict with all other deltas. The CR attribute contains a string and an empty string indicates that the delta will conflict with all other deltas. If two different regions are set on the same delta, then the conflict string is set to empty so that the delta will conflict with all other deltas. Typically, each tool has a unique conflict region that it sets on a delta. However, system tools, such as the security manager and member manager do not set a conflict region so that their deltas conflict with all other deltas. This is important because any tool may access the data in the system tools.

A DepSeq attribute is the set of dependency sequences of the delta. This may not exist if the only dependencies are implicit. Dependencies are described in more detail below.

A Gp attribute is the group number of the delta. A PurNot attribute is set when an engine that created one of the commands in the delta needs to be notified when the delta is purged. A Seq attribute holds a sequence number of the delta as described below. A Version attribute holds the version of the dynamics manager 420 that created the delta.

The content of the Del element 504, 604 includes a command element 508, if there is only one command, or a commands element 608 if there is more than one command. The command element 508 is followed by a content section that includes the command content and the commands element 608 is followed by a content section that includes command elements 610, 612 for each command in the delta. If the delta has only one command, the command element 508 will be a direct child of the delta element. If the delta has multiple commands, they will be contained in the commands element 608, which is a direct child of the delta. Cmd elements 508, 610 and 612 each represent a command in the delta. The content and most of the attributes of these elements are set by the engine that created the command. The attributes include an EngineURL attribute that is set to the URL of the engine that created the command. A PurNot attribute is set when the engine that created the command requires notification when the command is purged.

If there is no undo information for the command an empty comment "<!--->" 510 is used as a placeholder. If there is undo information, a CmdU element 614, 616 holds command undo information for one of the commands in the delta. The content and attributes on this element are set by the engine that executed the command.

Figure 7:
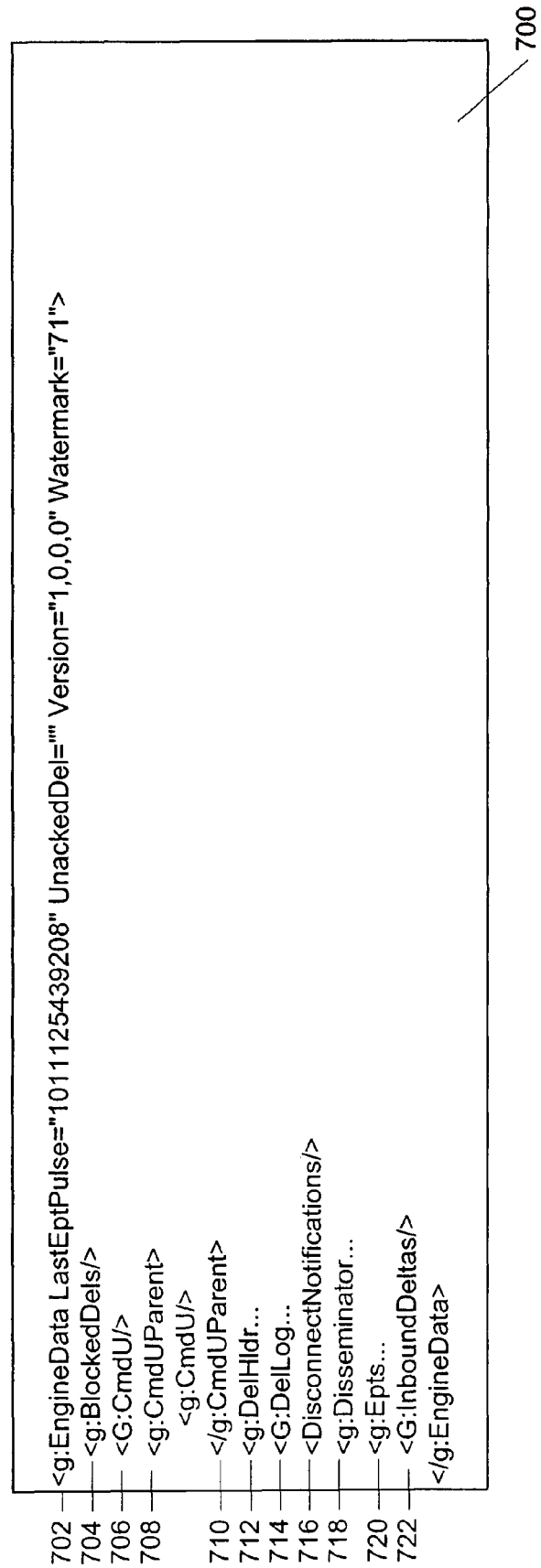
FIG. 7 is a diagram illustrating the structure of a persistent, XML document that represents deltas and delta processing structures in a dynamics manager.

When a delta is created, it is a unattached, or unparented, XML code fragment within a larger, persistent, XML document 440 that represents deltas in the dynamics manager 420. A typical XML representation of the document 440 is shown in FIG. 7. The XML document 700 includes an EngineData element 702 that is the root element for the dynamics manager document. The contents of this element include a number of other elements. These include a BlockedDels element 704 that is the parent for any deltas that are blocked. This element is used as a parent for any messages that are blocked. It contains an EptPul element that holds a pulse element from a different element and a LocalDel element that represents a delta including information specific to the local endpoint. A CmdU element 706 serves as a read-only empty command undo element. It is used as the undo element for all commands that do not have explicit undo information. The attributes and content of the CmdU element are specific to the engine that executes the command.

At times the dynamics manager 420 may create CmdU elements that are later determined to be superfluous. These CmdU elements are stored in CmdUParent elements for future use. For example, CmdUParent elements 708 and 710 are used as parents for extra CmdU elements. A DelHldr element 712 is used to represent a data structure called a "delta holder" 442. This structure is described in more detail below. Similarly, the DelLog element 714 represents a data structure called a "delta log" 438. It is also covered in detail below.

A DisconnectNotifications element 716 is used as a temporary parent for incoming disconnect notifications. A Disseminator element 718 is used to represent elements that are waiting to be sent to other endpoints or "disseminated." This structure is also described in detail below. An Epts element 720 is used to represent endpoints in the shared space. It is described in more detail below. An InboundDeltas element 722 is used as a temporary queue for incoming messages to the dynamics manager 420 and is described below. It contains a Del element representing the part of a delta common to all endpoints, a DisNtfy element that holds a disconnect notification from a different endpoint, a EptPul element that holds a pulse element from a different element and a LocalDel element that represents a delta including information specific to the local endpoint.

The attributes of the EngineData element 702 include a Blocked attribute that holds insertion point of a delta that caused the dynamics manager 420 to enter a blocked state. A BlockedCount attribute holds the count of the number of times dynamics manager 420 has been blocked. A Divergent attribute is set when the dynamics manager 420 for a shared space is divergent from other members of the shared space. The attribute is set to a string representing the reason for the divergence. A LastEptPulse attribute holds the time that the local endpoint last sent a pulse message. A PurgingDisabled attribute is set when purging is disabled. A UnackedDel attribute is set when there exists a delta that hasn't been acknowledged by a pulse. As will be discussed in detail below, these last three attributes are used when the delta log mentioned above is periodically purged. A PingSeq attribute holds a sequence number indicating the last time a relay server was contacted. An Uninvited attribute is set when the local endpoint has been uninvited from the space. A Version attribute holds the version of the dynamics manager data model. Finally, a Watermark attribute is used to keep the local cached state consistent with persistent state by detecting when transactions are aborted.

This persistent XML document 440 is maintained by a storage manager 216. A storage manager 216 that is suitable for use with the present invention is described in detail in the aforementioned U.S. patent application Ser. No. 09/588,195. In addition to creating the persistent XML representation 440, the dynamics manager 420 creates a COM object representing the delta. The latter object implements a number of interfaces that the tool 418 can use to add commands to the delta and to set properties of the delta.

Creating a delta also automatically creates a transaction in a transaction database that is associated with the shared space (not shown). Transactions provide an exclusive method of accessing the shared space database and make it possible to completely undo any changes that were started as a result of a particular delta. A transaction will be aborted if the delta that created it is aborted or if any errors occur during delta execution. The transaction is committed if the delta is committed and successfully executed.

Next, in step 304, the tool 418 adds one or more data change commands to the delta container, either directly or through the use of "creation nested" deltas, as described below. A command is a unit of change created and executed by an engine, such as engine 430, and a delta is a grouping of commands with the intention that all those commands are always executed together. Therefore, a delta is "atomic" in the sense that all of the commands in the delta are executed or none are executed. There is one exception to this rule that occurs during the handling of exceptions during command execution and is discussed below.

Figure 4:
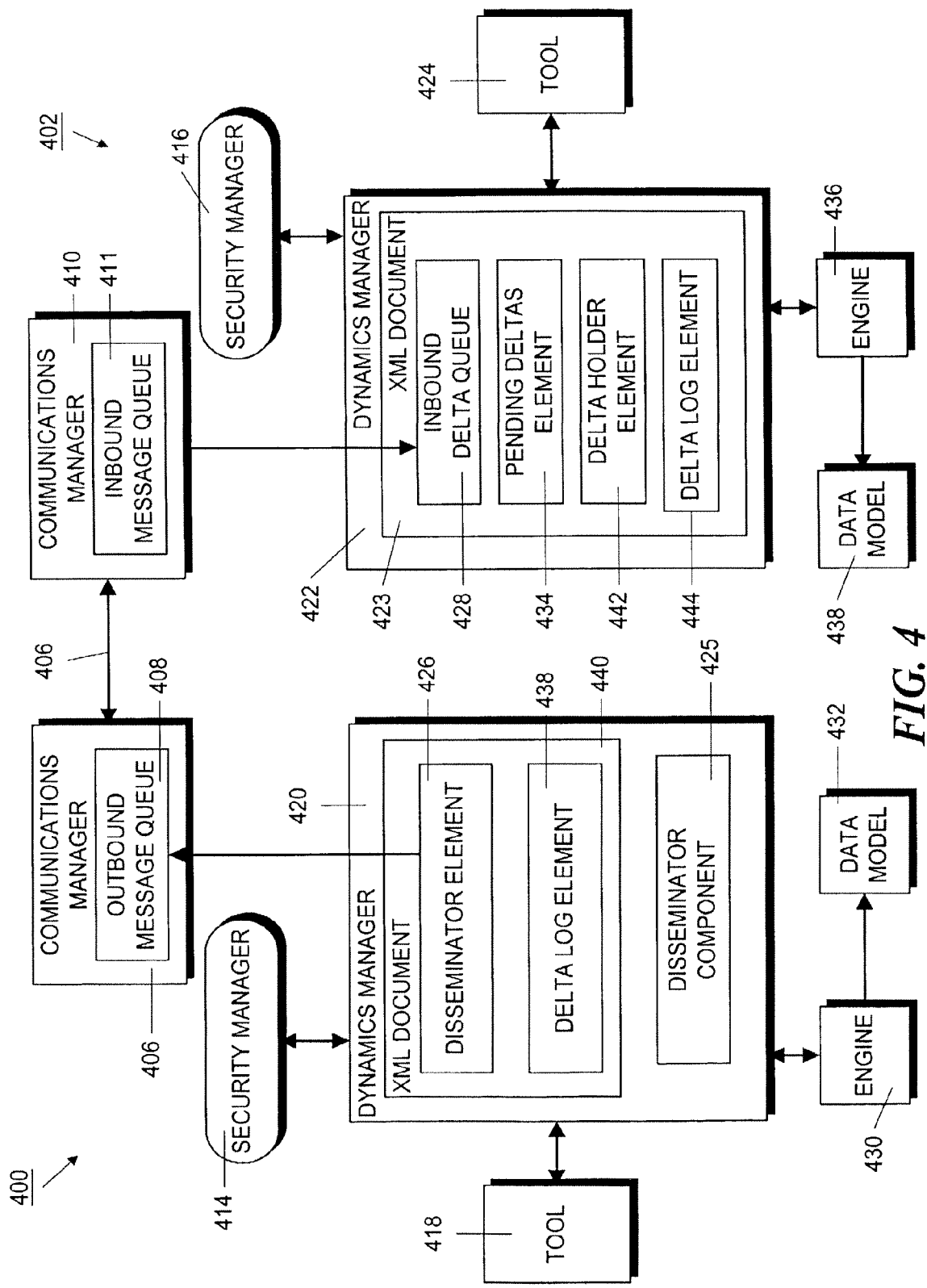
FIG. 4 is a block schematic diagram illustrating the major dynamics manager components involved in the generation, transmission and reception processing of deltas.

The interfaces on the COM object that is created with, and represents, the delta allow commands to be added to the delta. A command is added by using the dynamics manager 420 to create an empty command XML element (a Cmd element) within the aforementioned XML fragment that represents the delta within the XML delta document. At the time that the delta is created, the dynamics manager 420 must be provided with a bindable URL of an engine, such as engine 430 that will later execute the command. Although only one engine 430 is shown in FIG. 4, it will be understood by those skilled in the art that a plurality of engines may be present. In the description that follows, engine 430 will be used to refer to all of these engines. This URL is a unique name of that engine so that the dynamics manager can find the engine later when it is needed. The aforementioned EngineURL attribute is set on the applicable XML command element. The creator of the delta can then add any attributes and content that will be required to execute the command. For example, an engine that implements a sketchpad will have commands to draw objects. If the user draws an object on the sketchpad, a command will be created with attributes that describe the shape, color and location of the object. When this command is executed, both on the source endpoint that created the delta and on remote destination endpoints, the changes in the command will be applied to the data model 432 associated with the engine 430.

Figure 8B:
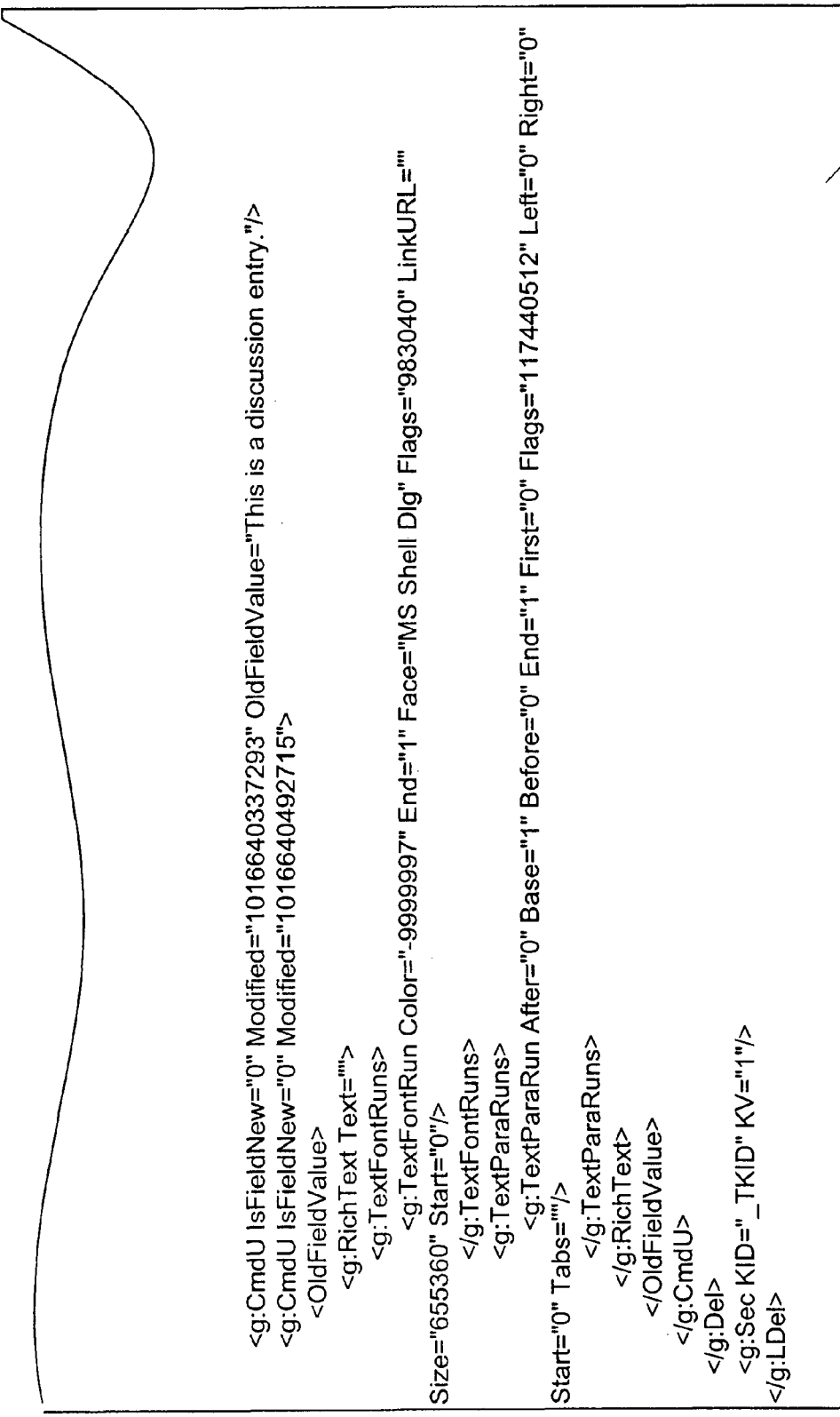

An alternative way to add commands to a delta is by "creation nested" deltas. Creation nested deltas provide an easy way to combine components to build more complex tools. For example, a tool could use a number of other components that could be other tools. When the user takes an action in the tool, that tool creates a delta container. The tool then calls the other components to add commands to the delta container. Instead of directly adding commands to the delta, a tool can create another delta and add this new delta to the first delta. Because the creation of this delta is nested within the creation of another delta, it is called a creation nested delta. For example, a set of steps during the creation of a delta could be:

Delta 1 Created
    Command A added
    Delta 2 Created (this is creation nested)
    Command B Created
    Delta 2 Committed
    Command C added
Delta 1 Committed The XML structure of a delta 800 that contains two creation nested deltas, both of which have undo information is shown in FIGS. 8A and 8B, when placed together. A creation nested delta has the same elements as a standard delta with some changes to the command element. For example, a Nested attribute in the Cmd element is set if the command was created as part of a creation nested delta. The Nested attribute is set to the ID of the creation nested delta. In addition, a NOrd attribute is set on the Cmd element to the ordinal of the command within the nested delta.

When a creation nested delta is committed as described below, any commands in the delta are executed, just as they would be for a non-nested delta. However, instead of storing the delta in a delta log 438 after the commands are executed, the dynamics manager 420 instead automatically adds the commands and undo information to the beginning of the containing delta. If the containing delta is aborted, the creation nested delta commands are also aborted. If the containing delta is committed, the creation nested commands have already been executed and are not executed again. Note that commands in the final containing delta are in the order that they are executed. Because they are not executed until the delta that contains them is executed, the execution order of the commands in Delta 1 above is B,A,C.

When a tool, such as tool 418, has completed adding commands to the delta, the tool 418 can either commit or abort the delta in step 306. If the delta is aborted, none of the commands is executed and the transaction that was started when the delta was created is also aborted. Because nothing further happens in that case, it will be assumed that the delta is committed in step 306. When a delta is committed, the remaining steps actually execute the commands in the local endpoint and disseminate the delta and its commands to the destination endpoints. The transaction that was started when the delta was created is not committed until after the delta has been executed and queued for dissemination.

Next, in step 308, the dynamics manager 420 determines where the newly committed delta will be inserted into a delta log 438. The delta log is an XML data structure that is actually part of the XML document 440 in the dynamics manager 420. The structure has a typical XML code structure such as that shown in FIGS. 9A and 9B, when placed together.

The delta log XML structure is comprised of several elements including a DelLog element 902 that represents the delta log. The DelLog element 902 has several attributes including a NeedToDelete attribute that is set when there are groups that have been purged but not deleted yet. A PenGrpNum attribute holds the number of the highest group that is pending for purge, that is that has been declared as eligible for purging. A PurGrpNum attribute holds the number of the highest group that has been purged.

The DelLog element 902 also includes other elements as its contents. These include one or more DelBlk elements 904 and 922, each of which represents a block of deltas. Delta blocks are used to implement priority deltas as described below. Within a block, the deltas are organized by group. Each block will have a content element for each group from the first group in the block to the highest group in the block, event if the group contains no deltas within the block.

Each DelBlk element, for example element 904, contains one or more DelGrp elements 906, 910 and 914, each of which represents a group of deltas. A delta group is a set of deltas organized into chains. There is one XML element for each chain within a group. The chains are ordered by increasing creator ID of the endpoint that created the chain. A DelGrp element 906 can have two attributes: a DoneTime attribute that holds the time at which the next group was created and a Number attribute that holds the number of the group.

Each DelGrp element, for example, element 906, contains one or more DelChn elements 908 representing a chain of deltas. Each DelChn element 908 has a CreatorID attribute that holds the ID of the creator of the chain. Each DelChn element 908 contains one or more LDelChn elements 910, each of which represents a delta.

Every position in the delta log 438 has a unique address, called an "insertion point." A new delta is always inserted at the end of the delta log 438 and, consequently, in order to insert a new delta, the insertion point corresponding to the end of the delta log 438 must be determined. In one embodiment, each insertion point consists of the combination of a group number, a creator ID, and a sequence number. In turn, the creator ID consists of a combination of an endpoint ID and a random number creator ID. The endpoint ID is a combination (for example, a hash) of the device URL and the contact URL of the endpoint and is a unique identifier of the endpoint. Every time an endpoint opens a shared space, the endpoint is assigned a new random number creator ID. The creator ID is intended to prevent collisions from occurring during the insertion of a new delta into the delta log with deltas created by the same endpoint. These collisions might occur in cases of a system crash, or a re-invitation to a shared space, which causes the endpoint to lose its internal record of previous deltas it had created.

Once the creator ID has been determined, the group number can be determined. In the particular embodiment under discussion and as set forth above, the delta log 438 collects deltas into chains and chains into groups. A chain consists of a deltas created by the same creator up to a predetermined maximum number of deltas. In order to determine the group number, the dynamics manager 420 first determines whether the newly committed delta can be added to the last chain being formed, that is, whether the chain contains deltas from the creator and there are less than the maximum number of deltas already on the chain. If the delta can be added to this last chain, the group number is the number of the group that contains the last chain. If the delta cannot be added, a new chain must be created.

Next, a determination must be made whether the new chain can be created in the current group, or if a new group must be created. In accordance with the embodiment, within each group, the chains must be in increasing order by creator ID. Because the insertion point for the new delta must be at the end of the delta log 438, the creator ID for the new delta must be compared with the creator ID of the last chain in the delta log. If it is greater, then the new chain can be added to the last group and the number of that group is the group number for the delta.

Otherwise, a new group needs to be created. The new group, and the new delta, will have a number one greater than the previous group. Finally, the sequence number is determined. The first delta created by a creator has a sequence number of "1". Each subsequent delta created will have a sequence number of one greater than the previous delta.

Taken together, the creation ID and the sequence number is a number called a "delta sequence." The group number is concatenated with the delta sequence to produce the insertion point. To make indexing easier, the group number and sequence are stored as separate attributes on the delta.

In step 308, the insertion point is "stamped" on the delta by including the calculated value in the delta attributes, but the delta is not actually inserted into the delta log 438 at this time. The insertion point must be included in the delta because certain special commands, such as adding a member to the shared space, use the delta insertion point. It would be theoretically possible to actually put the delta in the correct place in the delta log 438 at this point, but that would make the "undo delta" command much more difficult to implement.

After the insertion point is stamped, in step 310, the dynamics manager 420 executes the commands in the delta (this process is called "executing the delta".) In order to perform this step, the dynamics manager 420 iterates over all of the command elements and opens the attribute containing the bindable URL of the engine that is to execute the command. The dynamics manager 420 then binds to that engine—this process takes the URL and finds the engine that is associated with that URL. Once the dynamics manager 420 has located the engine (for example, engine 430), it calls the engine 430 to execute the command. In addition to providing the engine 430 with the command element describing the command, the dynamics manager 420 also provides an empty command undo element to the engine 430. The engine 430 can use this element to store any information that may be needed subsequently to undo, or reverse the execution, of the command. If the engine 430 adds information to the command undo element, the element is stored in the delta. For performance reasons, if the engine 430 doesn't store any information in the undo element, then the dynamics manager 420 uses an empty comment as a place holder for the undo element in the delta.

The steps performed in executing a command depend on the engine executing the command and the command being executed. An engine 430 will execute the command and apply any changes to its persistent data model 432. Engine 430 may also create "advises" that asynchronously notify it that the change has been made. Often it will add undo information to the command undo element, which undo information may be necessary if the command must be undone in the future. Each engine 430 can also perform an access control check to make sure that the creator of the delta has the permission to perform this command. This check is done on each endpoint before the command is executed. If the any endpoint does not have permission, then the engine 430 can throw an exception that is handled as described below.

In addition, the engine 430 can create execution nested deltas. An execution nested delta is created during the execution of commands in another delta. Execution nested deltas are similar to creation nested deltas, except that they are created while the commands in the containing delta is being executed instead of when the containing delta is being created. When creation nested deltas are executed, as discussed above, commands and undo information are added to the containing delta. However, when execution nested deltas are executed, the commands they contain and any undo information for those contained commands are stored in the undo information of the containing delta.

Creation nested deltas are only created on the endpoint 400 that creates the delta and the commands in them are then automatically executed on all endpoints that execute the containing delta. In contrast, execution nested deltas are typically created on all endpoints that execute the containing delta. The commands in them are not disseminated, so they may need to be generated on each endpoint that executes the containing delta. Executing the delta may have different effects on different endpoints, for example because of differences in the role of the member executing the delta. In these cases, the undo information may be different and execution nested deltas may not need to be created or may be different. Access control checks are not done in execution nested deltas since the check by the containing delta suffices.

When a delta is undone, the dynamics manager 420 will undo any execution nested deltas before it undoes the command that caused the execution nested deltas to be created.

Exceptions that occur during command execution are handled by the dynamics manager 420. Exception handling in the case when the delta is being executed on the endpoint 400 that created it is straightforward. The exception is thrown to the tool 430 that is trying to commit the delta. Care must be taken that any changes already made as part of this delta are undone. In order to make sure that these changes are undone, the dynamics manager 420 creates a "transaction" around the execution of each command. If an exception occurs during the execution of the command, then the transaction around that command is aborted. This latter process will undo any changes that were made as a result of the partial execution of the command.

Thereafter, the dynamics manager 420 calls other appropriate engines to undo any other commands that had already been executed as part of the delta. These calls allow the engines to undo any information that is not part of the shared space and, consequently, won't be automatically undone when the dynamics manager 420 aborts the transaction containing the entire delta. In addition to the transaction around the execution of each command, the dynamics manager 420 executes each delta within a transaction. After the engines have been called to undo any successfully executed commands, the dynamics manager 420 aborts this latter transaction as well. This transaction ensures that any changes in the shared space that were made as part of the delta and are not correctly undone will be automatically undone. Once the dynamics manager 420 has ensured that the changes made as part of the delta that had the exception are undone, it throws the original error back to the tool 430 that was attempting to commit the delta.

After execution, in step 312, the dynamics manager 420 adds the new delta into the delta log 438. This step is straightforward since the dynamics manager 420 has already determined the correct insertion point for the delta in step 308. The process then proceeds, via off-page connectors 314 and 316, to step 318.

As previously described, an important property of a collaboration system is "causality" which demands that, when a current data change command received from a first collaborator is executed by a second collaborator, the second collaborator will have executed all previous data change commands that the first collaborator had executed when the current data change command was created. One of the major properties provided by the dynamics manager 420 is "prior execution." In particular, the dynamics manager 420 ensures that an endpoint will not execute a delta unless it has already executed all deltas that had been executed by the creator of the delta when the delta was created. In order ensure prior execution, each delta has dependencies stored in it in step 318.

Delta dependencies describe all previous deltas that have been executed on the endpoint that created the delta. For example, consider the following transaction that occurs in five steps:

1) endpoint A creates delta A1.

2) endpoint A creates delta A2.
3) after receiving delta A2, endpoint B creates delta B1.
4) after receiving delta B1, endpoints A and B simultaneously create deltas A3 and B2.
5) after receiving deltas A3 and B2, endpoint C creates delta C1.

In this situation, for each delta, such as delta A2, 2 is the sequence number and A is intended as a shorthand notation for the creation ID as described above. Thus, the notation A2 represents the delta sequence. "Simultaneous" creation means that endpoint A creates delta A3 before receiving delta B2 and endpoint B creates delta B2 before receiving delta A3. The resulting deltas are said to be "independent."

One possible way to indicate the dependencies would be to stamp each delta with the delta sequences of all deltas that had been previously executed. If this is done in the example given above, the dependency set on each delta would be as indicated in brackets in the following delta list:

| | |
|---|---|
| A1 | { } |
| A2 | {A1} |
| B1 | {A1, A2} |
| A3 | {A1, A2, B1} |
| B2 | {A1, A2, B1} |
| C1 | {A1, A2, B1, A3, B2} |

As more and more deltas are created, the set of dependencies will continue to grow. In order to reduce the number of dependencies, implied dependencies are eliminated. For example, delta B1 depends on delta A2 and delta A2 depends on delta A1. Therefore, the dependency of delta B1 on delta A1 is already implicit in the A2 dependency of delta B1. The elimination of these implicit dependencies results in the following explicit dependencies on the deltas:

| | |
|---|---|
| A1 | { } |
| A2 | {A1} |
| B1 | {A2} |
| A3 | {B1} |
| B2 | {B1} |
| C1 | {A3, B2} |

As a further optimization, an implicit dependency of a delta on a previous delta from the same creator can be assumed. For example, it can be assumed that delta A2 implicitly depends on delta A1. With this further optimization, the resulting dependencies for these deltas is:

| | |
|---|---|
| A1 | { } |
| A2 | { } |
| B1 | {A2} |
| A3 | {B1} |
| B2 | { } |
| C1 | {A3, B2} |

Note that, it may be necessary for a delta to have multiple dependencies, such as the case of independent deltas. For example, in the latter dependency list, delta C1 depends on both deltas A3 and B2, but because there is no relationship between those two deltas, delta C1 must explicitly include the dependency on both of them.

Maintaining a list of dependencies for the next delta created by an endpoint is straightforward. The dynamics manager 420 keeps a set of new dependencies. Each time a new delta is committed, or assimilated, this set is updated by removing any dependencies of the new delta and then adding the new delta. For example, if another endpoint, D, exists in the example given above, its new dependency set would appear as follows after receiving each of the deltas generated by the other endpoints A, B and C above:

| | |
|---|---|
| A1 | {A1} |
| A2 | {A2} |
| B1 | {B1} |
| A3 | {A3} |
| B2 | {A3, B2} |
| C1 | {C1} |

If endpoint D created a new delta after receiving delta C1, then delta C1 would need to be the only explicit dependency of the new delta. At the time when dependencies are added to the new delta, a check is made for any dependency on a previous delta from the same creator, because that dependency is always implied.

Before each delta is sent to other collaborators, it must be "secured." This involves encrypting and integrity protecting the delta. Because these operations can be a relatively complex and time-consuming, the dynamics manager 420 performs these operations asynchronously (not on the main line of execution) when there are no transactions on the shared space database. This prevents encryption from interfering with other operations in the shared space. In order to secure a delta asynchronously, it is necessary to store some security information in the delta at this time. This security information will be used later by the security manager 414 to secure the delta. In step 319, the dynamics manager 420 engages the security manager 414 to store any information that will later be needed to encrypt the delta.

The asynchronous encryption and forwarding of the delta to other collaborators (called "dissemination") is actually implemented by a disseminator component 425 in the dynamics manager 420. This component 425 includes a disseminator queue element 426 in the XML document 440 where deltas and other messages that are to be disseminated are enqueued. An element with an attribute set to the sequence number of the new delta is enqueued to the disseminator element 426 in step 320. The enqueueing generates an event that will result in the dynamics manager 420 being called asynchronously on a different thread of execution to actually perform the dissemination. When the dynamics manager 420 is later is called back asynchronously, it, in turn, calls the disseminator component 425 to process any deltas in the queue 426. The disseminator 425 will dequeue the element, read the sequence number attribute, open the corresponding delta from the delta log and process it. After the delta is enqueued for asynchronous processing, the transaction on the shared space database that was started when the delta was created is committed.

Before being sent to other collaborators, each delta is secured by encryption and integrity protection. Encryption prevents anyone who intercepts the delta message from obtaining useful information. Integrity protection allows the dynamics manager to detect if another party modifies the delta. When processing a delta, the disseminator component 425 of the dynamics manager 420, in step 322, uses the security manager 414 to secure the delta with the previously stored information. The delta is secured in a two-phase process. The first phase is initiated with the shared space database locked. During this phase the relevant security information, such as keys, are read from the shared space database. During the second phase, which happens without the shared space database locked, the delta is actually secured.

Only part of the delta will be sent to other collaborators, and only that part is secured. Any information in the local delta element is not disseminated or secured. Also any command undo information that is relevant only to the local endpoint 400 and is not disseminated or secured. Securing a delta leaves the delta element itself, which contains the group number, the sequence number and the dependencies, unencrypted (but integrity protected). This information may be needed before the delta can be decrypted, so it must be sent unencrypted. The command elements are encrypted and sent as content of the security process. A local delta element also has a content element that the security manager 414 can use to store any local data that must stored for the delta. A secured delta looks like the following:

406 that sends the delta to other endpoints in the shared space. The process then ends in step 328.

Figure 10A:
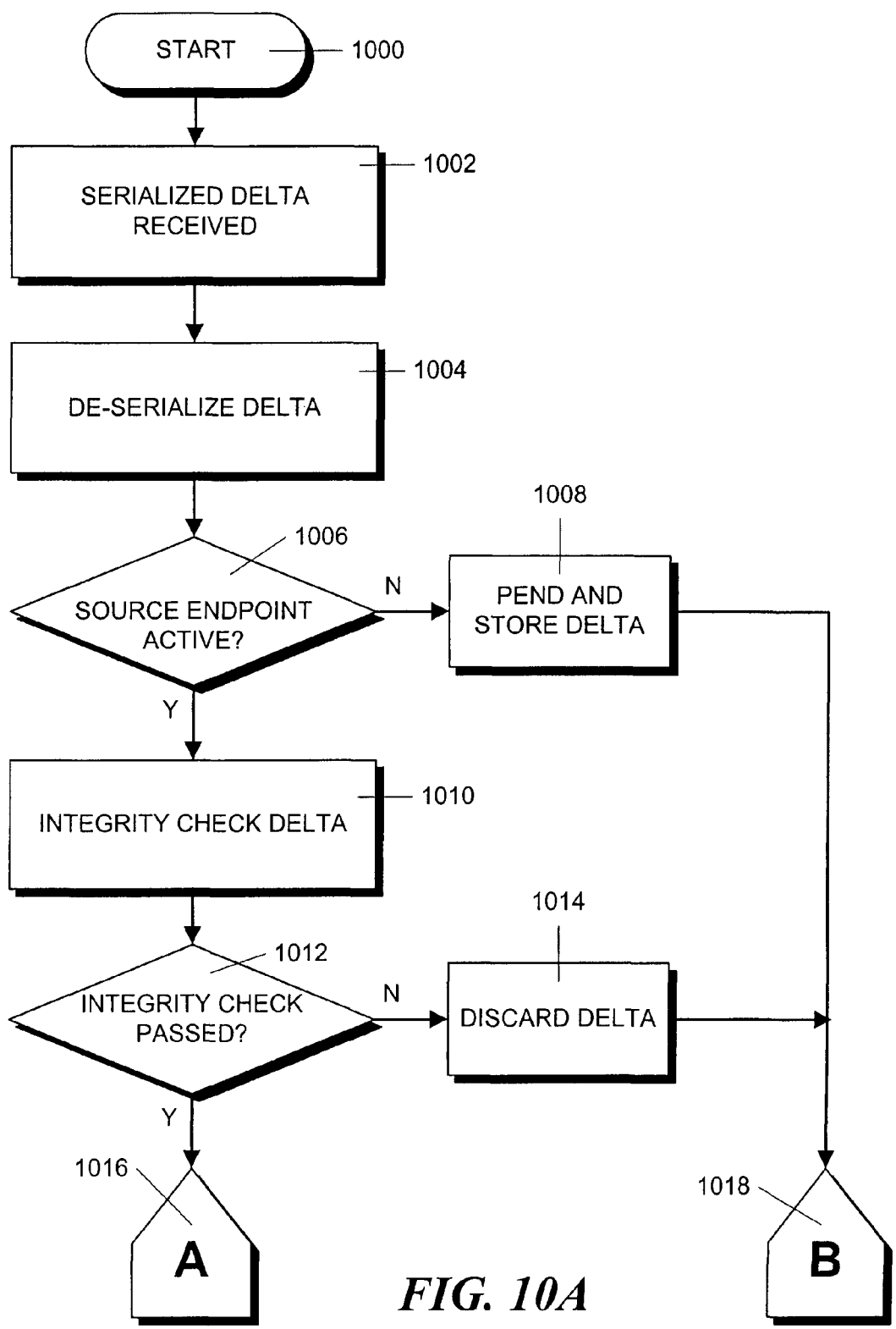
FIGS. 10A and 10B, when placed together, form a flowchart illustrating the steps in a process for receiving and processing a delta at an endpoint.
Figure 10B:
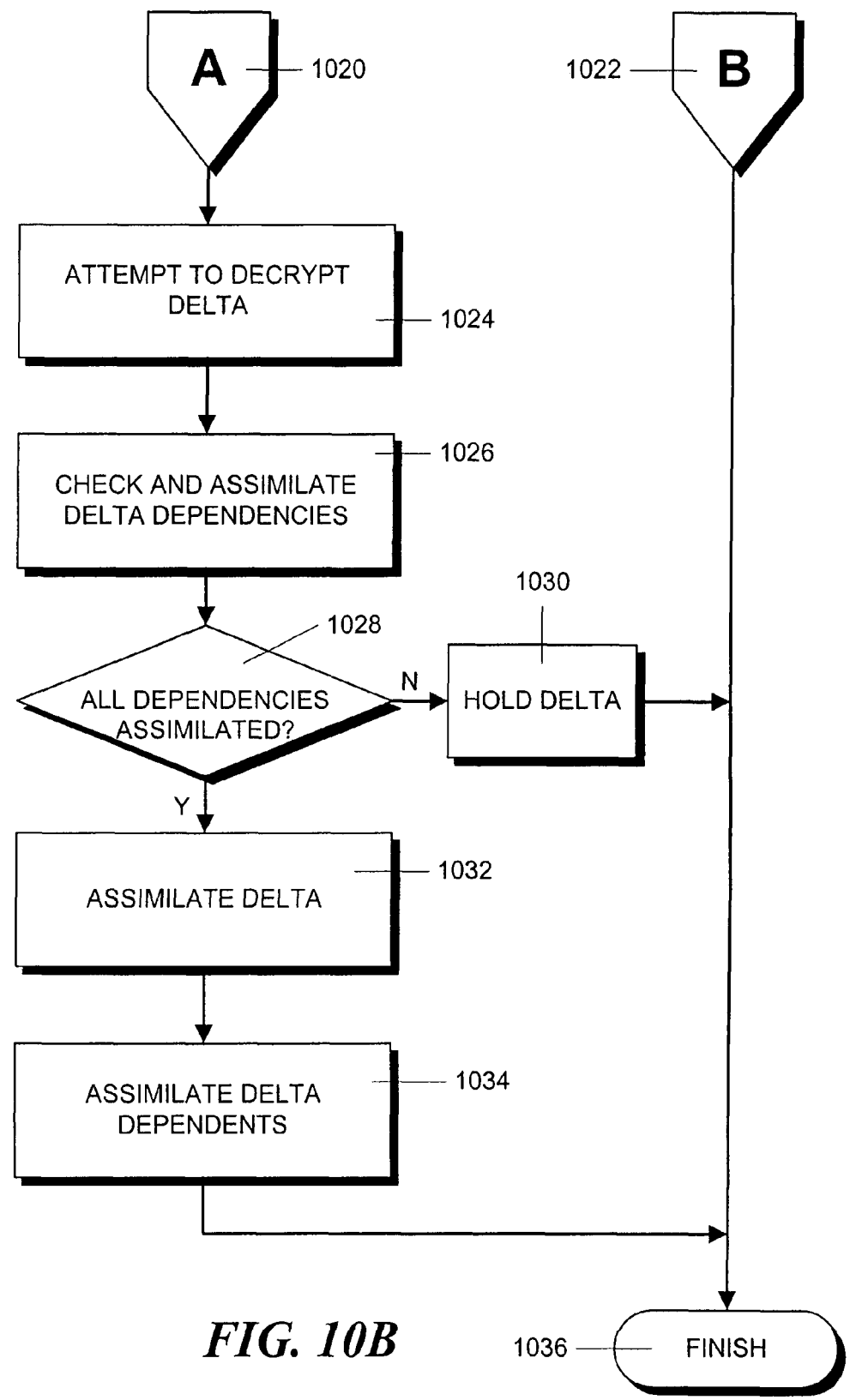

FIGS. 10A and 10B, when placed together, illustrate the steps in a process for receiving a delta in a destination endpoint 402 from a source endpoint 400. This process starts in step 1000 and proceeds to step 1002 where at a destination endpoint 402 in the shared space, a serialized delta is received by the communications manager 410 in that endpoint 402. The communications manager 410 then locates the correct shared space to handle the delta, and calls the dynamics manager 422 in that shared space to process the received delta.

The dynamics manager 422 then de-serializes the delta in step 1004. This process converts the delta data back into XML code that is stored in the XML document 423 in the dynamics manager 422. At this point, the dynamics manager 422 can

```
<urn:groove.net:Del CR="Ywyi5Fkw" DepSeq="6C58D518236030D3BEA50001" Gp
="352" Seq="1E3F58465D4741E945370003" Version="1,0,0,0">
    <urn:groove.net:SE Version="3,0,0,0">
        <urn:groove.net:EC EC
="mk1BJa1etosZfG0tnsUPsJN7Nud4Zlz86op+M0jcj8OjwQEVbTXrJBR8PnakL7icF0S4
7qLMRwUj7yloV2C5lAjXGvP/zM1XF2pUPYHJSh+PryjJxmQ9w+EltEn0ll1vyP9RzN7Ne
N2v/l/mrhzeSv6Y9awd+qTWhf1luZ4TLV6mV9S6i1GVI9VnKoD0M2wpP+CsK9GEk0tK
guhK4mTYspQgAvBGOdJoqf5J1qvGUWmly1C9eWjrCMP7+V9k2SqXgOzTffGM1EXsy
tVI4kKin5eazhNI49JDPGuB5cgFRXzAi9s1dhlZWX1q4VA24UHfTpOL6cet7JhqMN04gB
Dvu6tbUTIpcS9BtsMKHtv3EZVIaq80C/tiAel5X+NKGSJaZher7rMJjPdxNjx9M4jur5jUrUK
6xMRnnxcHPD1vJ1pVjP5UR2flC1hFeKPaZ13QyJcB10lSaGg1yvTDrLqw6jMzF6nSL7r
LtLMz+iMvxmmQCk9aLB7UuudZ0ygp4eOjnOep+C0EipOyWGUCb8kNSKhn4PcGCSjd
Pc2jJVXa9nw4BAkCeVkpESMUaXpGhcYtSBbATxCNDzrYYm0HVUAXhknQAAHwP0C
2zjq5Tze71V4vpz+cbANOYs2zCcfndohCV+tTClbwPc+kzgbbWqmciJsd+QulwmdV4op
ZD/1STQaM9iC9hRRpvo4dg69M3xX1CUNDkOwGD0tcfU+k00NgU5ja7+qUp2UXa15K
k0pJxEfsysd2QY2bak8aaEFR9AVcWIEwl2UBcr+y8aRJTJqMY9jmvz2ZIEdSYU7qmVp
bT7ncNcxQ0oIXbD9s++PVC+nNSEQXH4WSABLDDpKcFgpqpQLWk1Ra+lKpfPtGmfm
YnqveKM/d1x/oKwfMa4zxo9qhvJQd55KrTjl7knH08ZalKiNbanfVilylPn9HJxF6GSyn+cQ
TgstmcN0hKHyAmAraOe54ydGChH9W3rGT8RVtJxbz+BhpTMIUCqP4ehFqtjsESGUV4
iLFHNg4UpKXd4H8b61w4ZpHakVPgtaqRhrpVgzgeTu0QhRQ9Ug3HE6koNwQKcW8d
hVCZbCorVW6mR3PhzGO3R358+zIXTwNfXxlnRhwA5L6kHnZJywjEjeZb2hGDUtyWV
hc"
IV="0dERdZ3iJCWDlo1WeZbmEI+Lxv+PojBF" KID="368BC06A9DB273B133A80002"
KV
="2"/>
        <urn:groove.net:Auth PTSig
="i1alU0dLC7OYcrmmdzelc+uTnAGv2Ak1RE9oVL4Zy9tylUL5ybT81uVXtGNViSwtZ57
BwPrfrgnGQbQcVi/N+duGYGAOc4zL4Mp0L4Vn6tzw6LZP8elU1TDDztpenzZG4zkJcLt
vhjnEp82VIU923FnTotv4PeSQOFkpwvc5ZAkpwd8NsmctR41ULc7c8faf1MlqdYF4iQfW
0iAlpz7Bo9jnO5f0TOHnlcCWE0tLp32lEIHjh2qMfnAIDbt5B4zW"/>
    </urn:groove.net:SE>
</urn:groove.net:Del>
```

Here Del is the delta element, with attributes as explained below. The SE element is the secured element with a single attribute that is the version of security used for the delta. The EC element is the encrypted content that is the result of encrypting the commands in the delta. The EC element contains a base64 encoding of the encrypted commands (if the encrypted commands are very large, a binary document will be used instead of a binary attribute). The IV element is an initialization vector used in the encryption algorithm, the KID element is the security key ID and the KV element is the key version number. The Auth element contains the authenticator that is used to integrity protect the delta. The PTSig element is a base64-encoded signature for the delta.

After being secured, the delta is serialized in step 324. For example, in one embodiment, the data is serialized as WBXML, a standard binary encoding for XML. If the delta has any binary documents, they can be bundled together as a MIME message.

Finally, in step 326, the serialized delta is forwarded to an outbound delta queue 408 in the communications manager recognize that this is a delta element. All new inbound deltas are placed in an inbound delta queue 434 in the dynamics manager XML document 423. This queue 434 serves as a temporary holding place until the dynamics manager 422 is ready to process them. Often the dynamics manager 422 will wait until it has received all deltas from other sources, such as a relay server, before beginning to process the deltas. Once the dynamics manager 422 is ready to process the data, the delta is removed from the inbound delta queue 434.

In step 1006, a check is made whether the endpoint that sent the delta is in an "active" state (endpoint states are discussed below.) The delta is "pended" in step 1008 if the endpoint that sent it is not in an active state. This is required because the delta that added the endpoint to the shared space may not have been executed and received deltas cannot be processed until it has been executed. Thus, all deltas received from an endpoint are pended until the delta that created the endpoint is obtained. Similarly, if an endpoint that generated the deltas has been "uninvited" from the shared space, then the system will not process a delta from that endpoint unless another endpoint that is still active in the shared space has also executed that delta. Pending deltas are stored in a pending deltas element 428 under the appropriate creator, until a decision is made to execute the delta. The pending deltas element 428 is periodically purged. If the pending deltas are not executed, they are deleted when the group that contains them is purged from the pending deltas element 428.

If the delta is not pended as determined in step 1006, the sending endpoint is known and the delta can be integrity checked in step 1010 by the security manager 416. It is important to verify that the delta has not been tampered with at this stage, before continuing to read the dependencies and other information from the delta. If the delta fails an integrity check, it is discarded in step 1014 and the process proceeds, via off-page connectors 1018 and 1022, to finish in step 1032.

If the delta passes the integrity check in step 1012, the process proceeds, via off-page connectors 1016 and 1020, to step 1024 where an attempt is made to decrypt the delta. It is possible to decrypt the delta at step 1024, if the correct key is available. Because the dependencies of the delta have not been checked, it is possible that certain keys for the delta are missing. If that is the case, the delta is decrypted later. The decryption step converts the SE element in the encrypted delta back into the commands in the delta.

Figure 11A:
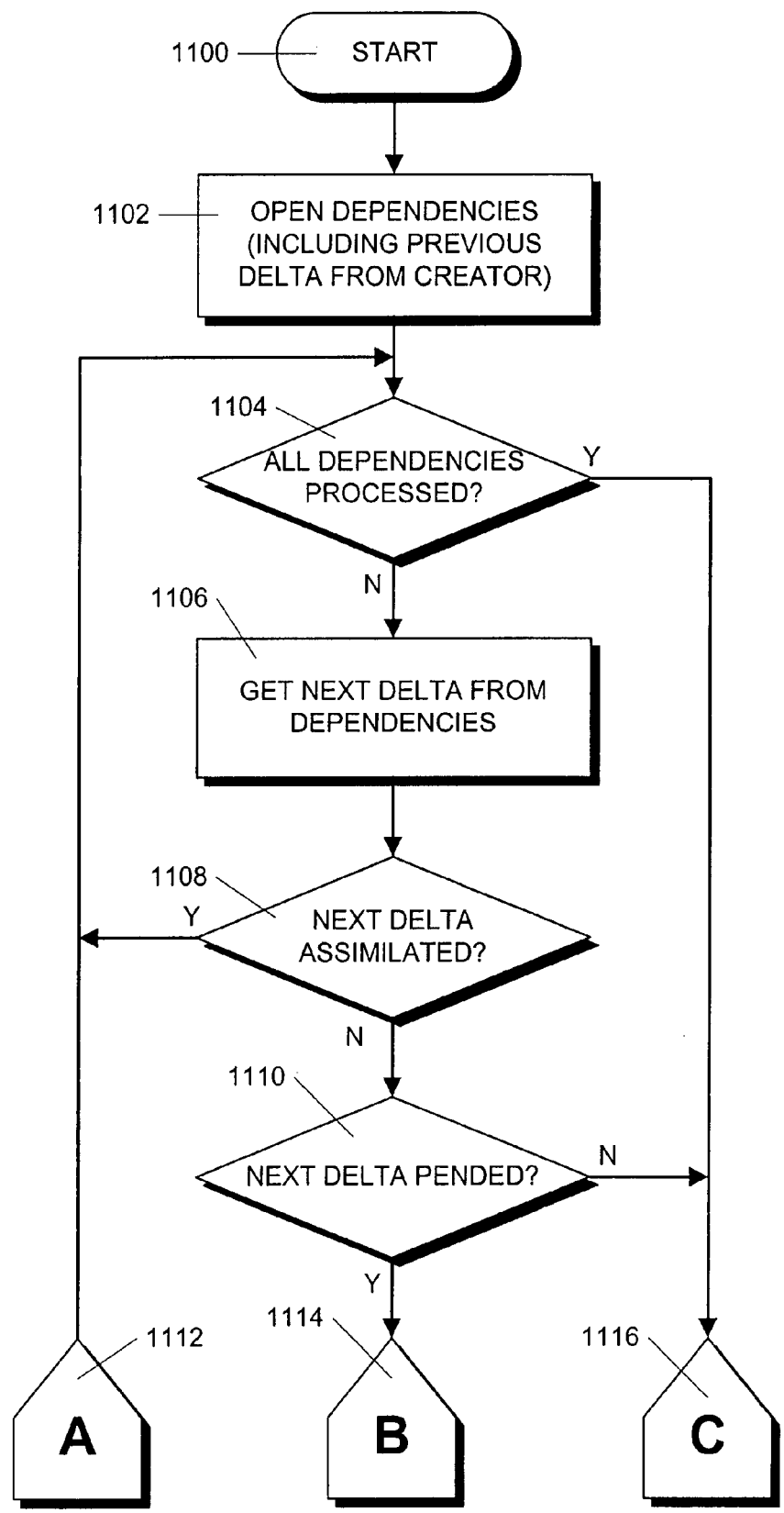
FIGS. 11A and 11B, when placed together, form a flowchart that illustrates the steps in a process of assimilating a new delta.
Figure 11B:
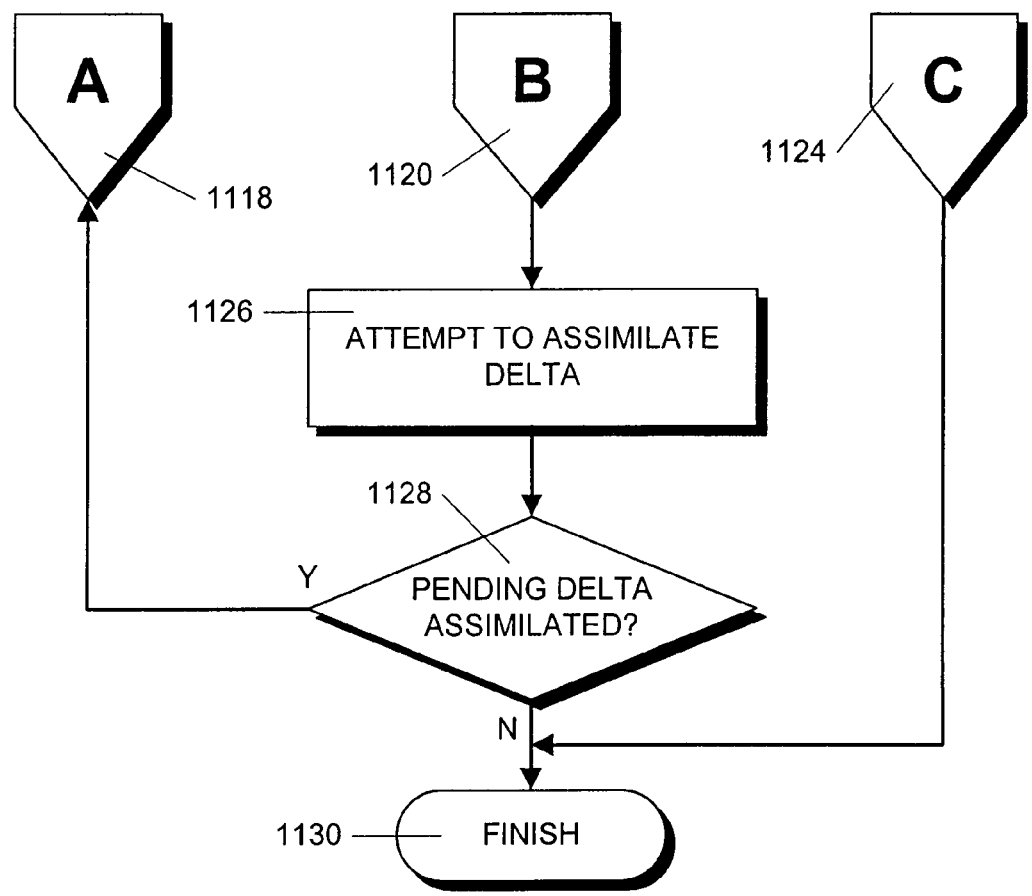

Next, in step 1026, the dependencies of the delta are retrieved by the dynamics manager 422 by examining the dependency attribute of the delta. Since the dependency attribute is not encrypted, the dependencies can still be retrieved even if decryption was not possible in step 1024. The dependencies are then assimilated as shown in more detail in FIGS. 11A and 11B, which when placed together form a flowchart that illustrates the steps in the process.

Dependency processing begins in step 1100 and proceeds to step 1102 where the list of explicit dependencies is opened from the attribute in the delta. If this is not the first delta from a creator, the previous delta from the creator is added to the beginning of the dependency list. In step 1104, a determination is made whether all of the deltas that are dependencies have been processed. If so, dependency processing proceeds, via off-page connectors 1116 and 1124, to finish in step 1130.

Alternatively, if in step 1104, it is determined that not all dependencies have been processed, then in step 1106, the dynamics manager 422 retrieves the next dependency from the list of dependencies. For each of these dependency deltas, a check is made, in step 1108 to determine whether that dependency delta has been assimilated as described below. If that dependency delta has already been assimilated, then the process returns to step 1104 to check if any further dependencies remain.

If any of the deltas in the dependency set have not been assimilated, then, in step 1110, a determination is made whether the next delta has been pended. If the delta has not been pended, then the process proceeds, via off-page connectors, 1116 and 1124 to finish in step 1130 because the next delta is missing. Alternatively, if the next delta has been pended as determined in step 1110, then the process proceeds, via off-page connectors 1114 and 1120, to step 1126 where an attempt is made to assimilate the pended delta. If the attempts is successful as determined in step 1128, then the process proceeds, via off-page connectors 1118 and 1112, back to step 1104 to determine whether additional dependencies must be processed. Alternatively, if the pended delta cannot be assimilated as determined in step 1128, then the process finishes in step 1130 because the dependency is missing.

Figure 12:
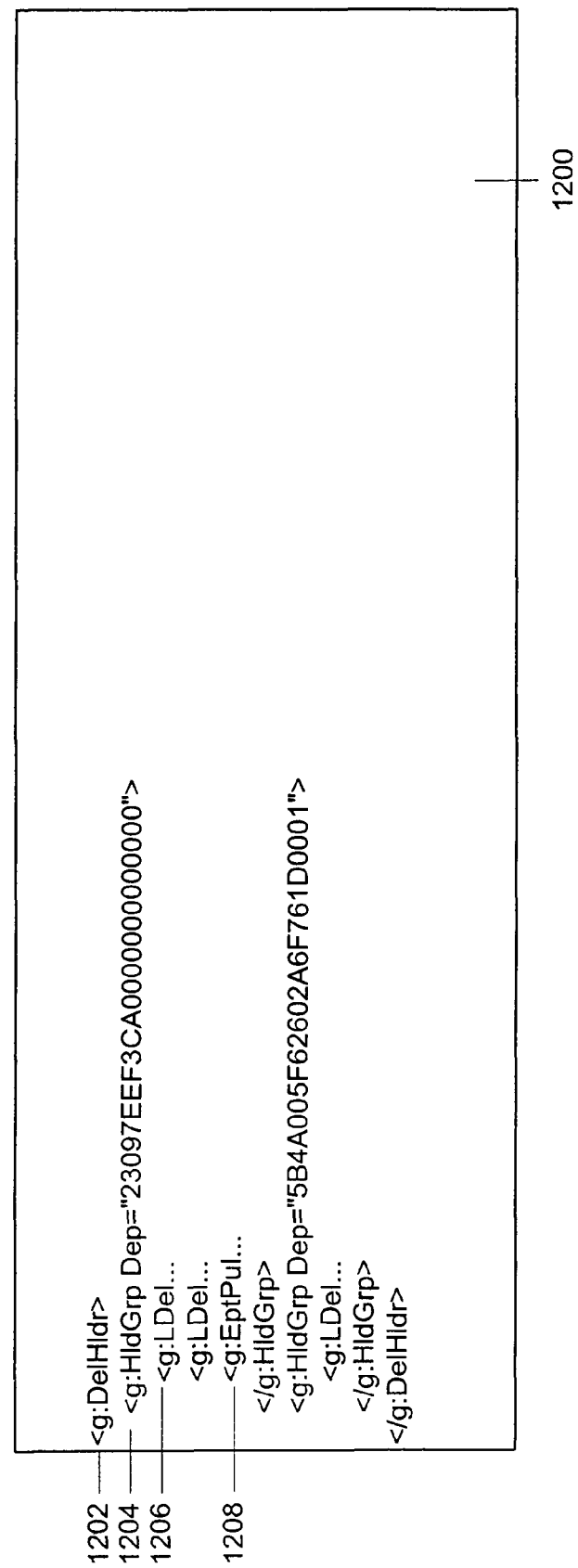
FIG. 12 is a diagram showing an XML data structure of a delta holder that holds deltas during processing.

If the new delta cannot be assimilated because some of its dependencies cannot be processed, it is placed in a delta holder 442. The delta holder is an XML data structure in the XML document 423 associated with the dynamics manager 422. It has a structure 1200 as shown in FIG. 12. The delta holder 1200 includes a DelHldr element 1202 representing the delta holder. This element has an ActiveBlockNum attribute that holds the number of the currently active block. The DelHldr element 1202, in turn, includes one or more HldGrp elements, each of which represents a group of held deltas and endpoint pulses that are all waiting for the same dependency. Each of these elements has a Dep attribute that specifies the dependency for which all the held deltas and pulses are waiting. Each HldGrp element includes one or more LDel elements, each of which represents a held delta and one or more EptPul elements, each of which represents a held pulse. The new delta is stored in a HldGrp element of the delta holder 442 corresponding to the missing dependency delta.

If the missing dependency delta is not pended as determined in step 1110, then the dynamics manager 422 attempts to fetch the dependency delta from other endpoints in the shared space. In particular, a fetch request is sent to another endpoint in an attempt to retrieve the delta. In order to increase efficiency, fetch requests may be batched for all deltas and requested with one request.

Since the number of deltas that must be fetched from another endpoint can be large and, therefore, occur over a significant time period, it is necessary to prevent an endpoint from making multiple fetch requests for the same deltas while it is still receiving the deltas from a previous request. Multiple re-fetching is prevented by associating a sequence number with each fetch request. If an incoming fetch request does not have a high enough sequence number, then an endpoint receiving the request will not send the requested deltas. A fetch response sequence number is stored for each endpoint and used when a fetch request is received by that endpoint. In addition, a fetch request sequence number is stored for each endpoint and used when that endpoint generates a fetch request to another endpoint. These sequence numbers both start at zero and are used in the following manner.

Figure 13:
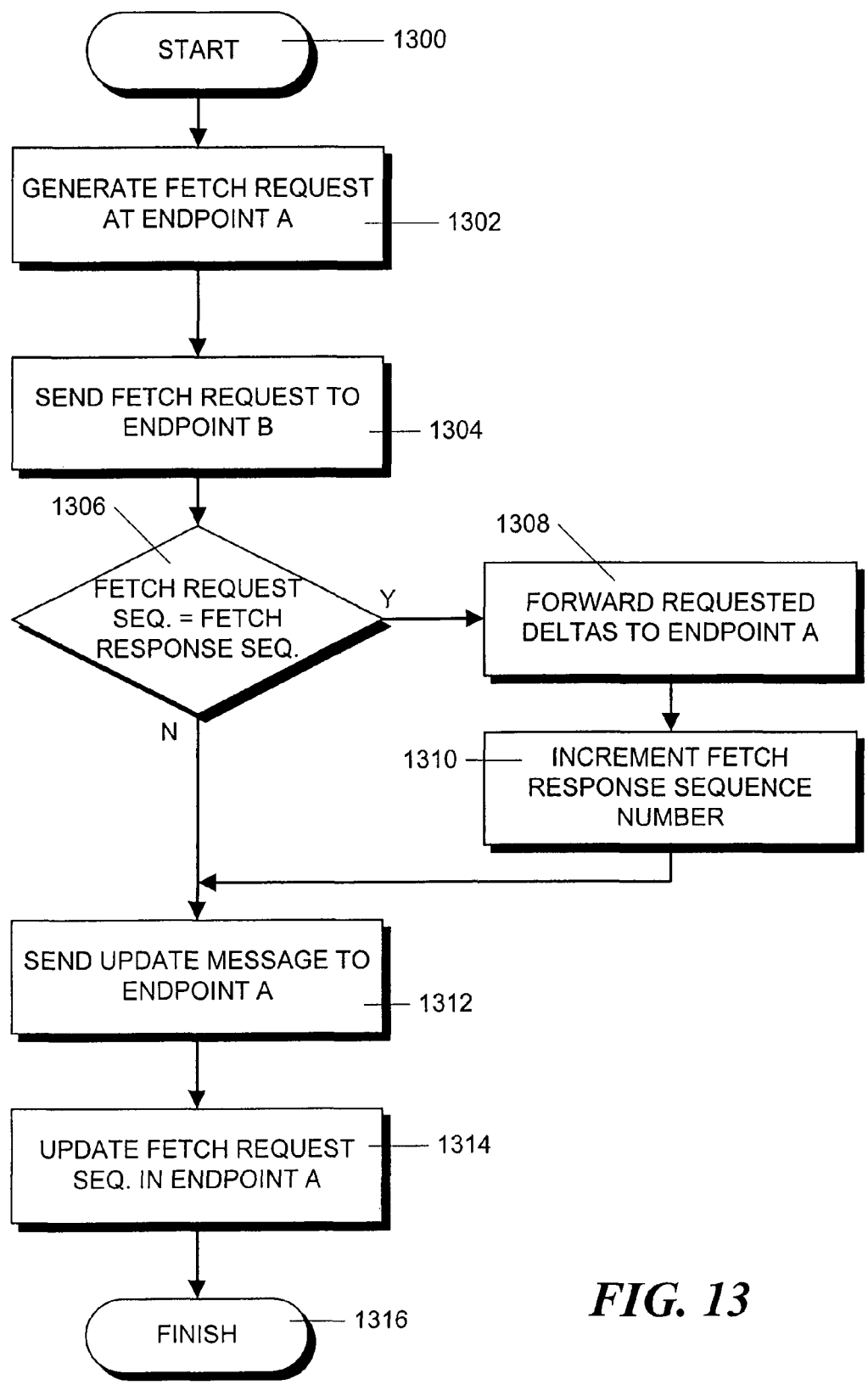
FIG. 13 is a flowchart showing the steps of an illustrative process for limiting over-fetching during the processing of a delta.

The fetch process is illustrated in FIG. 13, which begins in step 1300 and proceeds to step 1302 where a fetch request is generated in a first endpoint, for example, endpoint A and sent to another endpoint, for example endpoint B in step 1304. When such a fetch request is generated, it includes the fetch request sequence number. When a fetch request is received, in step 1306, the fetch request sequence in the request is compared with the stored fetch response sequence number in the receiving endpoint. If the two sequence numbers are equal, then the fetch request is valid and, in step 1308, the requested deltas are forwarded back to endpoint A. The receiving endpoint then increments its stored value of the fetch response sequence as set forth in step 1310. Next, the receiving endpoint sends a fetch sequence number update message containing the value of the fetch response sequence number to the requesting endpoint in step 1312. However, if the fetch request was invalid as determined in step 1306, then the requested deltas are not sent. Instead, only the update message is sent in step 1312.

When the fetch sequence update message is received at the sending endpoint, the sending endpoint updates its fetch request sequence number as set forth in step 1314. In particular, if the fetch response sequence number in the received message is larger than current fetch request sequence number being used by the sending endpoint, then the endpoint sets its fetch request sequence number to the sequence number in the update message. Otherwise, the sending endpoint does not change its fetch request sequence number. The process then finishes in step 1316.

The following is an example of the use of these sequence numbers. Assume that there exist two endpoints A and B each with internal stored values of fetch request sequence numbers and fetch response sequence numbers with values of zero. Endpoint A realizes it is missing deltas 1-100 and sends a fetch request for these deltas to endpoint B. This fetch request has fetch request sequence number with a value of zero. Endpoint B receives the fetch request, compares the sequence number therein to its stored fetch response sequence number (with a value of zero) and determines that the fetch request is valid. Endpoint B then sends the requested deltas to endpoint A and increments its stored fetch response sequence for endpoint A to a value of one. Endpoint B also sends to endpoint A, a fetch sequence update message carrying a sequence number of one.

Assume that endpoint A receives deltas 1-20 but decides to request deltas 21-100 again even though these deltas and the fetch sequence update message are still in transit. Endpoint A sends another request with a fetch request sequence number with a value of zero. Endpoint B receives the new fetch request from endpoint A and realizes that the request is invalid since the fetch request sequence number in it (with a value of zero) is less then its current fetch response sequence number for endpoint A (with a value of one). Therefore, endpoint B does not re-send deltas 21-100, but instead sends another fetch sequence update message carrying an update sequence number with a value of one.

Endpoint A then finishes receiving deltas 21-100, and also receives the first fetch sequence update message. Accordingly, endpoint A updates its internal fetch request sequence number to a value of one. Endpoint A ignores the second fetch sequence update message since the update sequence number value carried by it is less than or equal to its stored fetch request sequence number. Therefore, the same deltas are not sent twice.

Figure 14B:
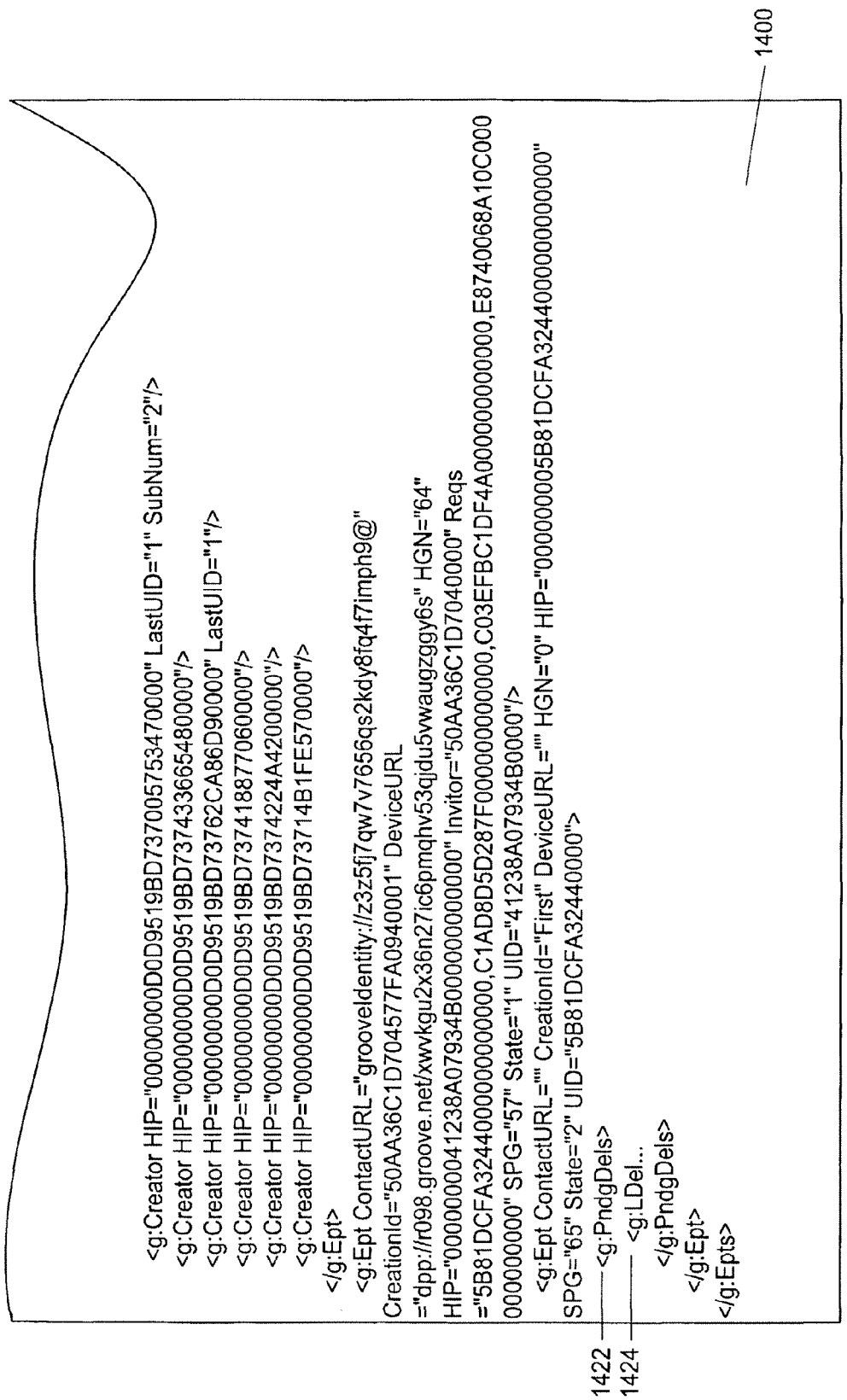

The fetch request and fetch response sequence numbers are stored in and endpoints data structure that is part of the XML document 423. A sample XML data structure for holding endpoint information is shown in FIGS. 14A and 14B, when placed together show an illustrative XML structure 1400 for storing information regarding endpoints. The structure is comprised of a number of XML elements. The Epts element 1402 represents the collection of endpoints. This element 1402 has an NDeps attribute that holds the new dependencies that need to be set on the next delta that this endpoint creates. The Epts element contains one or more Ept elements 1404, 1406, each of which represents a single endpoint.

Each Ept element 1404 has a number of attributes including a ContactURL attribute that holds the contact URL of the endpoint. A CreationId attribute holds the sequence of the delta that created the endpoint, or the notation "First" if this endpoint created the shared space. A DeviceURL attribute holds the device URL of the endpoint. A HGN attribute holds the highest group number for that endpoint has declared in a pulse or by creating a delta. The HIP attribute stores the highest insertion point for a delta created by the endpoint. An OldCreationIds holds sequences of deltas that had previously invited this endpoint into the shared space.

An OutOfDateTime attribute is set to the time at which the first local delta was created since the last message received from the endpoint. A PendingLaggard attribute is set when the endpoint is a laggard as described below. The PurGrp attribute holds the highest group that this endpoint has declared it is willing to purge. A Reqs attribute stores deltas that are needed to assimilate held deltas from the endpoint and a ReqSeq attribute holds the fetch request sequence number to be used when the next fetch request is received at the endpoint. A RespSeq attribute holds the last fetch response sequence number sent to the endpoint after responding to one of its fetches.

The SPG attribute stores a secondary purge group used to determine what to purge in edge conditions such as when an endpoint has not created deltas. A State attribute holds the state of the endpoint for use in purging decisions that are discussed below. The UID attribute holds the unique ID of the endpoint. In one embodiment, this is a hash of the values in the ContactURL and DeviceURL attributes.

Each of the Ept elements, for example element 1404, contains one or more Creator elements 1408-1418, each of which represents a creator and a PndgDels element 1420 that is used as a parent for pending deltas. Each Creator element represents a creator. Each time an endpoint reopens a space it creates a new creator to use when creating deltas. This creator has a random id that is used to make sure delta sequences are unique in the case of a crash or other event that may cause a loss of information. Each Creator element has several attributes including an HIP attribute that holds the insertion point of the highest delta created by the creator. A LastUID attribute holds the last sequence used in generating a unique ID for this creator. A PurgeGrp attribute stores the number of a group that when purged, permits the creator to be deleted. A SubNum attribute holds the last sub-sequence number used on an identity targeted or asynchronous delta created by this creator as described below.

The PndgDels element (434, FIG. 4) is the parent of any pending deltas. As previously mentioned, pending deltas are deltas that the dynamics manager may, or may not, want to assimilate. Pending deltas only occur if deltas are received before an endpoint is added to the space or after an endpoint has been removed. The PndgDels element 1420 contains one or more LDel elements 1422, each representing a delta.

Returning to FIGS. 10A and 10B, after the dynamics manager has attempted to assimilate all dependencies in step 1026, the process proceeds to step 1028 where a determination is made whether all dependencies have been assimilated. If not, the process proceeds to step 1030 where the original delta is held. The process then finishes in step 1036.

Alternatively, if it is determined in step 1028 that all dependencies have been assimilated, then the process proceeds to step 1032 where the new delta is also assimilated. Assimilating a delta consists of creating a transaction in the shared space database and putting the delta in the delta log 444. As discussed above, every delta has been previously stamped with a group number and a sequence. Thus, the process of inserting a delta into the delta log 444 starts with a determination of the correct group element in the delta log 444. If the group does not exist, it is created at this point. Then, the group is examined for a chain corresponding to the creator ID in the delta sequence. Again, if the chain does not exist, then it is created. The delta to be assimilated is added to the end of the chain.

Once a delta has been assimilated, it will be executed before the dynamics manager 422 commits the current transaction on the shared space database. Errors that occur during delta execution are handled by rolling forward or rolling back any commands that had been executed. In addition, the transaction that was started around the delta execution is aborted. The delta execution errors are handled as each delta is executed and before the current transaction is committed. To limit roll back and roll forward, the dynamics manager 422 attempts to assimilate as many deltas as possible before executing them. Therefore, the delta log 444 keeps track of how many deltas have been assimilated but not executed. This count will be used to make sure that all of the deltas are executed.

After assimilating the delta, it may now be possible to assimilate additional deltas that depend on the assimilated delta. These deltas are called "dependents." This latter assimilation is performed in step 1034. Specifically, within the delta holder 442, deltas are grouped based on the delta that they are waiting for. So whenever a delta is assimilated, a check is made to determine if there are any deltas in the delta holder 442 that were waiting for that delta. If such deltas exist, then an attempt is made to assimilate those deltas. During this latter assimilation, a check is made on the dependencies on those deltas, and if they are now all assimilated, the dependent deltas can be assimilated as well. Delta processing then finishes in step 1036.

Figure 15A:
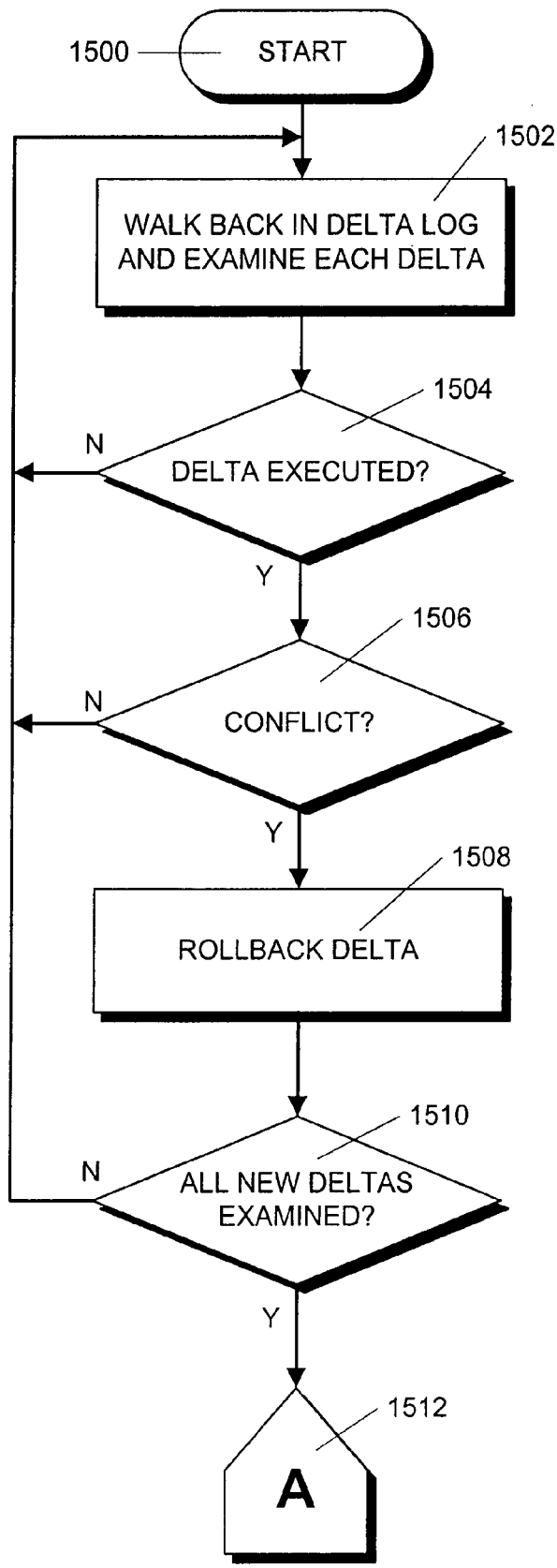
FIGS. 15A and 15B, when placed together, form a flowchart that illustrates the steps in a process of executing a new delta.
Figure 15B:
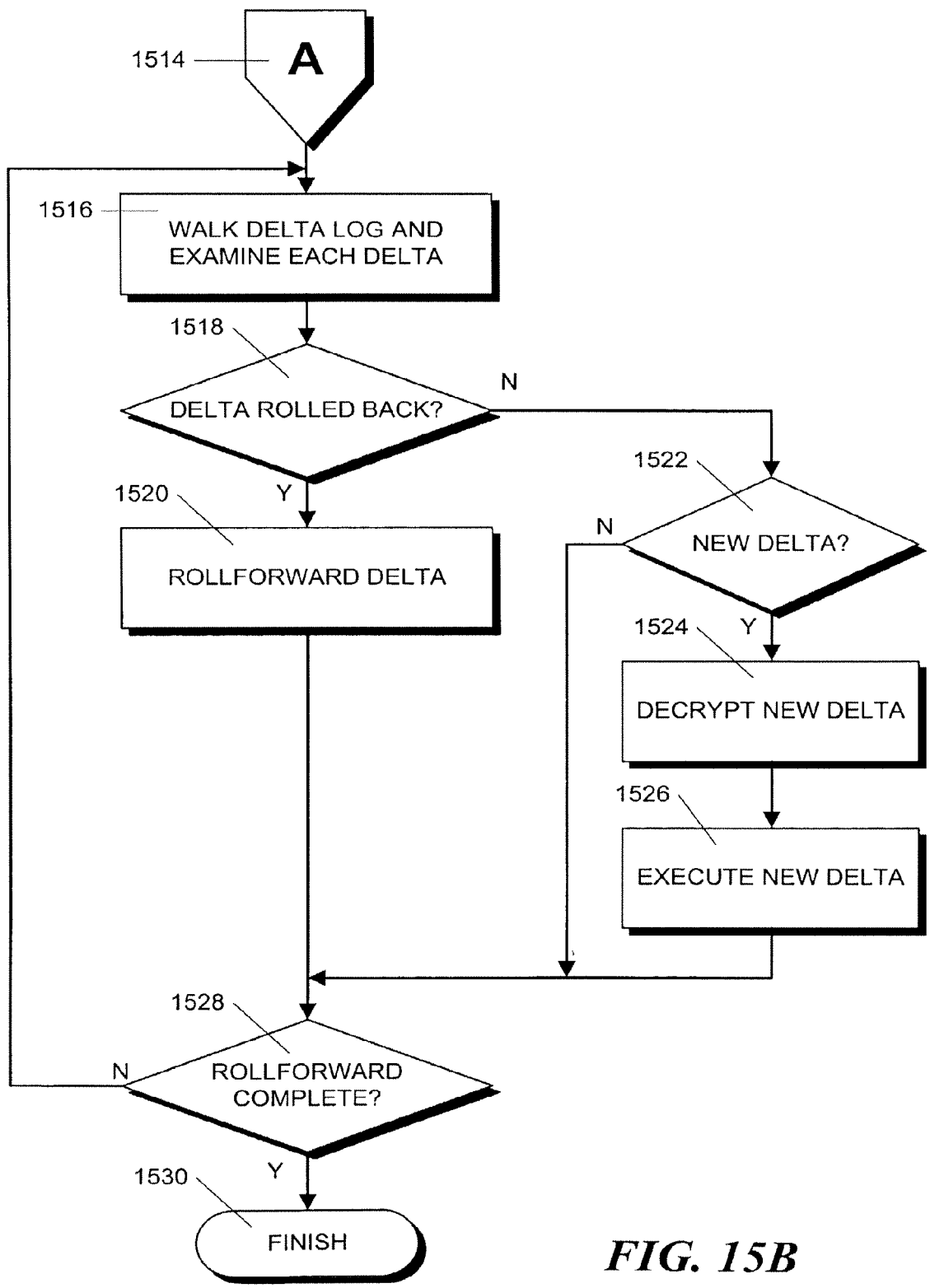

The execution process is illustrated in more detail in FIGS. 15A and 15B. This process begins in step 1500 and proceeds to step 1502, where the dynamics manager 422 walks backward through the delta log 444, starting from the end of the delta log and proceeding to the beginning of the log. In particular, because the log is arranged into chains, groups and blocks, the end of the log is the last delta in the last chain in the last group in the last block. Each delta in the last chain is examined moving towards the beginning of the chain. When the beginning of the last chain is reached, the process continues with the last delta in the next-to-last chain and so on until all deltas in the first chain in the group has been examined. Then, the process continues with the last delta in the last chain in the previous group. When the first group in a block is reached, then the process continues with the last delta of the last chain of the last group in the previous block. Operation continues in this manner until all newly assimilated deltas are found.

If a delta under examination has not been executed, as determined in step 1504, process returns to step 1502 where the next delta is examined. However, if the delta being examined has been executed, as determined in step 1504, the dynamics manager 422 checks, in step 1506, to determine whether it will conflict with any of the other assimilated deltas. During the assimilation process described above, a set of the aforementioned conflict strings of all assimilated deltas is built. The conflict check is performed by comparing the conflict string of the delta under examination with all conflict strings in the conflict string set. If the strings in any pair of strings are the same or if either string being compared is empty, then the corresponding deltas conflict. If there is no conflict, then the process returns to step 1502 where the next delta is examined.

If there is a conflict as determined in step 1506, then, in step 1508, the dynamics manager rolls back the delta. As previously mentioned, the dynamics manager 422 must ensure that different endpoints converge, by insuring that all of the deltas are executed in a consistent order in each endpoint. It is possible that one of the newly assimilated deltas was assimilated at a position in the delta log 444 before the position of an independent delta that has already been executed. If such a situation occurs, in order to ensure convergence, the already-executed delta must be "rolled back" before the assimilated deltas are executed, and then "rolled forward" after the assimilated deltas are executed.

Rolling back a delta consists of iterating over the commands in the delta in reverse order. When each command is encountered, the engine 436 is called to undo the effect of the command. The engine 436 has access to the command element and the command undo element in each delta that the engine previously generated when the delta was last executed.

If there is an error during the rollback of a command in the delta, the dynamics manager 422 will attempt to redo any commands in that delta that had already been rolled back, so that the delta is left in the executed state. The process then proceeds to step 1510 where a determination is made whether all new deltas have been examined. If not, the process proceeds back to step 1502 to continue examining deltas.

If all new deltas have been examined as determined in step 1510, the process proceeds, via off-page connectors 1512 and 1514, to step 1516 where the roll forward procedure begins. In step 1516, the delta log is walked and each delta is again examined. A determination is made in step 1518 whether the delta being examined has been rolled back. If so, the process proceeds to step 1520. Alternatively, if the delta was not rolled back, either because there was no conflict as determined in step 1506 or because an error occurred during rollback, the dynamics manager 422 determines in step 1522 whether the delta is a new delta. If the delta is not a new delta, the dynamics manager 422 does nothing and the process proceeds to step 1528. However, if the dynamics manager determines in step 1522, that the delta is a new delta, then in steps 1524 and 1526, the new delta is decrypted and executed. The process then proceeds to step 1528.

If the delta was successfully rolled back, as determined in step 1518, then, in step 1520, the dynamics manager 422 begins a roll forward, or re-execution, of all the commands in the delta. This process is exactly like the process of executing the delta in the first place. During this roll forward operation, the dynamics manager 422 will find all the newly assimilated deltas, including the delta that initiated the processing. Although the dynamics manager has already integrity checked this latter delta, it was possible that it could not be decrypted at that time as explained above. If the delta has not previously been decrypted, then it is decrypted as part of the roll forward process. At this point, any dependency deltas will have been executed. Therefore, the key needed to decrypt the delta will be available and the decryption should succeed.

The re-execution of the commands in the delta is performed in the same manner as the execution of commands described above in order to execute a delta on the endpoint that created it. However, in the case of an error during the execution, it is not possible to throw an exception to the tool that created the delta, because the tool is on a different machine. Instead, if such errors occur, after rolling back any successfully executed commands and aborting the transactions, the delta is just marked as having had an exception on execution and the dynamics manager continues with the process.

Exceptions during the execution of deltas that add new endpoints to the space are treated differently. If one endpoint in the space successfully adds the new endpoint, in is necessary for the dynamics manager to add the endpoint on all other endpoints in the shared space. This can be a problem in certain situations, for example if the add member permission was removed from the inviter of the new endpoint independent of the invitation. To handle these cases, the dynamics manager will continue to execute other commands in an add endpoint delta after an exception.

In any case, the process then proceeds to step 1528 where a determination is made whether the roll forward process is complete. If not, the process returns to walking the delta log in step 1516. If the roll forward operation is complete, the process then ends in step 1530.

The processes described above illustrate the creation, transmission and reception of normal deltas. However, in accordance with the principles of the invention, special deltas have been created in order to handle several special situations.

These latter deltas include asynchronous deltas, identity disseminated deltas and priority deltas. Asynchronous deltas are not sent as part of the normal communications traffic within a shared space. Instead, they are used for transferring very large files to prevent the deltas that contain them from blocking the transmission of other deltas in the shared space for a long time period and for supporting the transfer of asymmetric files. Asynchronous deltas have certain differences from normal deltas. The most important of these differences is that no future deltas can depend on an asynchronous delta. Therefore, other deltas in the shared space can be executed before the asynchronous delta arrives and asynchronous deltas will not have to be executed to maintain consistency. In addition, the dynamics manager will not fetch missing asynchronous deltas from other endpoints and, thus, their delivery is not as reliable as normal delta delivery. Finally, because no deltas depend on an asynchronous delta, it is not necessary to send asynchronous deltas to all endpoints in the shared space. This property makes transmitting asynchronous deltas to specific endpoints much simpler than normal deltas and allows support for asymmetric files.

However, asynchronous deltas have dependencies that permit the dynamics manager to guarantee prior execution, that is, when an asynchronous delta is executed on a remote endpoint all non-asynchronous deltas that the creator had executed at the creation time of the asynchronous delta will also have been executed on the remote endpoint. Asynchronous deltas also have a well-defined insertion point in the delta log and can be rolled back before the execution of deltas with lower delta log insertion points. Other deltas with a higher delta log insertion point will be rolled back before execution of an asynchronous delta. Asynchronous deltas are not guaranteed to be executed in the same relative order on all endpoints and, therefore, there is no convergence in the case of asynchronous deltas.

Asynchronous deltas can be interleaved with other deltas in the shared space and may be sent at a lower priority. For example, a large file may be transmitted with a combination of normal and asynchronous deltas. Normal deltas will be used to send the file descriptor and asynchronous deltas will be used to send the file contents. A GUID will be used to match descriptors with contents at the destination. The asynchronous delta containing the file contents may be sent as soon as the file is added (symmetric files) or may be sent only when a remote endpoint requests the file (asymmetric files). The XML structure of an asynchronous delta is the same as a normal delta as illustrated in FIG. 5, except an Async attribute on the Del element is set when the delta is asynchronous.

Identity targeted deltas are designed to support unread marks and other information that only needs to be known by other instances of the shared space for an identity. Identity targeted deltas can only be targeted at the local identity. These deltas are only sent to a subset of the endpoints in the shared space where this subset consists of the endpoints of the member that created the delta. As with asynchronous deltas, no other deltas can depend on an identity-disseminated delta, so identity disseminated deltas do not support convergence or reliability.

The dynamics manager 422 handles asynchronous and identity disseminated deltas as "subdeltas." Instead of being identified by a delta sequence, subdeltas have a delta "subsequence." A sub-sequence is the sequence of the last delta created by the creator followed by a sub-number. The sub-number is incremented each time a new sub delta is executed. For example, if creator A executes a delta, then two identity disseminated deltas, then another delta and finally another identity disseminated delta, these deltas and subdeltas would have the following sequences and subsequences:
A1, A1.1, A1.2, A2, A2.1

Like normal deltas, sub-deltas are always inserted at the end of the delta log and have a fixed group number and insertion point in the delta log. In the above example, A1.1 is always inserted after A1 and before A2. It could be in the same group as A1, in the same group as A2 or in a group between the two. Because sub-deltas may not be sent to all endpoints, there is a much greater chance for other endpoints to create deltas that are independent in relation to sub-deltas. This greatly increases the chance that a sub-delta will be rolled back. However, because there are a limited number of deltas per group, an endpoint generating independent deltas will advance the group number and then the independent deltas will come after the sub-deltas. This limits the number of times that sub-deltas are rolled back.

Dependencies are set on a sub-delta in a manner similar to a normal delta. Because the sub-delta is not sent to all endpoints, the dependencies are not removed from the new dependency set after setting the dependencies on a sub-delta. In the example above, the deltas would have the following dependencies.

| A1 | { } |
| A1.1 | {A1} |
| A1.2 | {A1} |
| A2 | {A1} |
| A2.1 | {A2} |

Note that because they are all on previous deltas from this endpoint, these dependencies are not explicitly set on the deltas. Because sub-deltas are not sent to all endpoints, they cannot contain new security keys for the space. When securing deltas, the dynamics manager does not send a rekey in a sub-delta.

An XML file of an identity-disseminated delta is shown in FIG. 16. This delta 1600 includes one command and undo information for that command and an execution nested delta with one command and undo information for that command. The IdDiss attribute 1602 of the Del element 1604 is set when the delta is an identity disseminated delta. The SubSeq attribute 1606 of the Del element 1604 holds a sub-sequence of the delta.

Priority deltas are used to address two situations that occur in the delta dissemination system described above. The first situation is that when a new endpoint is invited to a shared space, it must be sent the contents of a delta log containing all the previous deltas generated in the shared space because deltas executed independently with deltas that the inviter had executed prior to the invite could cause the rollback of those prior deltas. For that reason, the newly invited endpoint requires all of those prior deltas. The contents of a delta log are often much larger than the actual data in the shared space and the transmission of such contents can result in a significant time delay in the startup of a new endpoint.

The second situation can be illustrated in a shared space in which there are ten endpoints. One endpoint goes offline and executes a delta. The remaining nine endpoints are all online and each execute one hundred deltas. When the offline endpoint comes back online, the other endpoints will all receive the delta executed when the endpoint was offline and the (now) online endpoint will receive the deltas generated when that endpoint was offline. To achieve convergence, there are two possibilities. If the delta from the endpoint that is offline comes after the other deltas, the endpoint that went offline would need to rollback that delta, do the nine hundred deltas from the other endpoints, and then roll forward that delta. None of the other endpoints would need to do rollback. However, if the delta from the offline endpoint came first in the delta log, the other nine endpoints would each have to rollback the nine hundred deltas, do the one delta, and then roll forward the nine hundred deltas. Obviously, the former situation involves much less work, however, because of the manner in which group numbers are assigned, the latter situation, or at least one close to it would be the most likely to happen.

Both situations are addressed by priority deltas that provide a way to control the ordering of independent deltas. These can be used to address the first situation by ordering independent deltas so that deltas independent with an invite delta do not cause a rollback and therefore it is not necessary to send the entire delta log to a new invitee. Similarly, such an ordering can be used to reduce the amount of rollback in order to address the second situation. Priority deltas are processed so that a delta independent of a priority delta will be ordered after any deltas that the priority delta depends on. For example, if independently A generates deltas A1 and A2 and A2 is a priority delta and B generates B1, then, because A2 is a priority delta, B1 will always be ordered after A1. B1 might come before or after A2.

To address the first situation mentioned above, any time a new endpoint is added to a shared space, the delta that adds it has the highest possible priority. Therefore, none of the prior deltas will need to be rolled back. To address the second situation, endpoints that are online and generating deltas will periodically make one of the deltas a priority delta. In the example given above, this means that the nine hundred deltas generated by the nine online endpoints will contain a number of priority deltas. The offline endpoint will not generate a priority delta, so very few of the nine hundred deltas will need to be rolled back and the amount of work will be greatly reduced.

In order to prevent interference between simultaneous priority deltas, the priority of a delta will be ignored if there is an independent delta with a higher priority (or the same priority but a lower insertion point). This operation is problematic in that, if there are two independent deltas that add a new endpoint to the space, one of the newly added endpoints will need to do a rollback of deltas that it may not have. This latter situation is addressed by marking one of the newly invited endpoints as "out of sync" and requiring it to be re-invited to the shared space.

Priority deltas are implemented by adding a layer of structure to the delta log called a delta "block." Delta blocks are the largest division in the delta log. Blocks contain groups, groups contain chains, and chains contain deltas. A group may actually be split among multiple blocks. Each block contains any number of groups and each block has one particular delta that is the priority delta that caused that block to be created. When a new priority delta arrives, it will cause a new block to be created as long as that new block does cause the re-assimilation of another delta with a higher priority. Any assimilated independent deltas are removed from the previous block and moved to the new block (this requires a roll back to the previous location of an independent delta and then a roll forward with the independent delta in the new position). These independent deltas can be detected if priority deltas contain a complete representation of the delta log state. The delta log state consists of a list representing the highest sequence received from each endpoint. Note that it will be possible for a group to be split between different blocks so that absolute delta ordering by group and sequence will no longer be true.

Figure 9B:
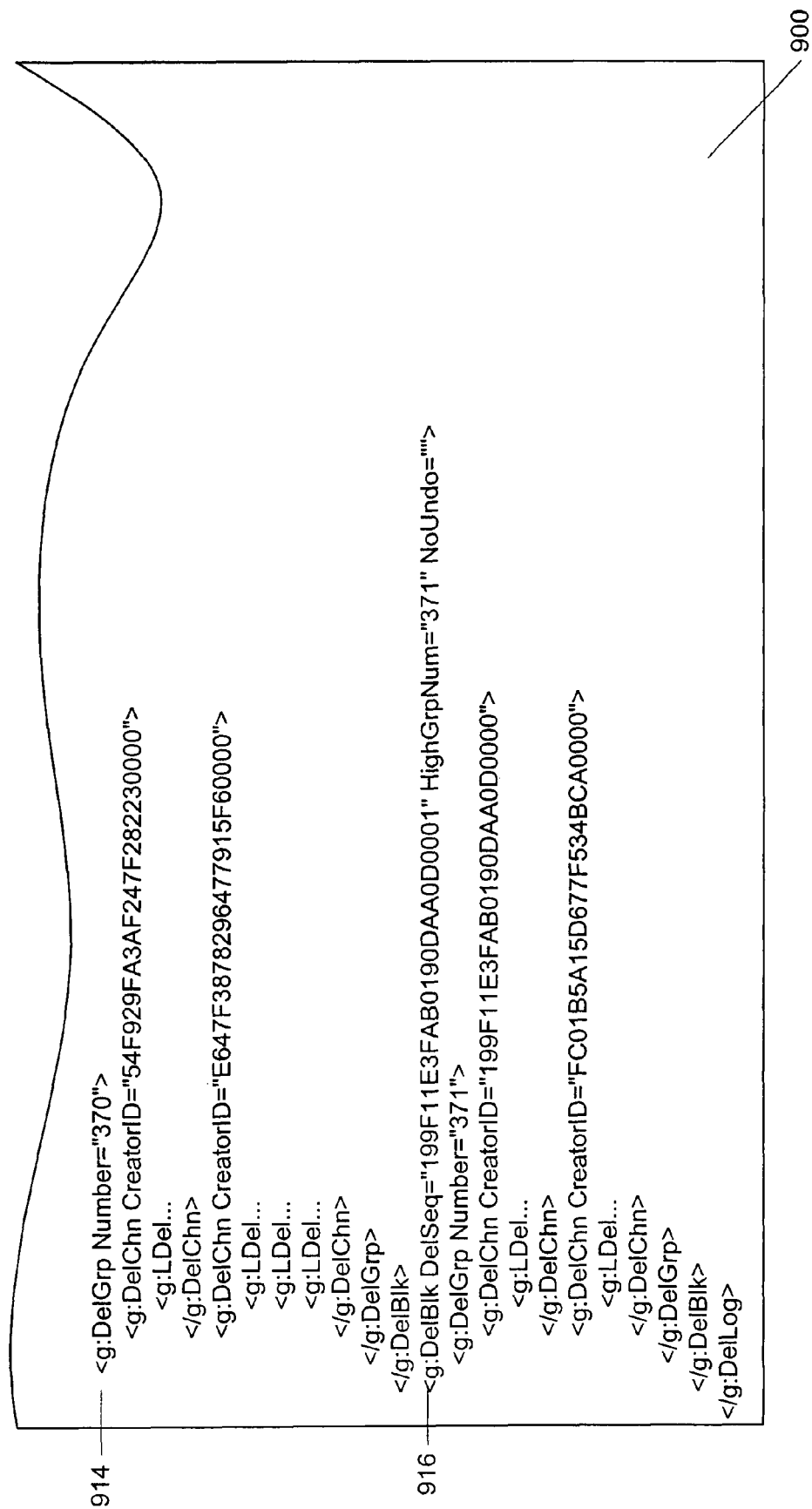

Referring to the XML implementation of the a delta log as illustrated in FIGS. 9A and 9B, delta blocks are implemented by including one of more DelBlk elements in the delta log. A block is defined as a set of deltas with a block delta, which is the highest priority delta in the block. All deltas that the block delta depends on are located in previous blocks. All deltas that are independent of the block delta are in its block. Deltas that depend on the block delta may be in its block or in subsequent blocks. This arrangement ensures that all deltas independent of the block delta are assimilated after all deltas on which the block delta depends.

A DelBlk element, such as element 904 has several attributes including a DelSeq attribute that holds a sequence number of the priority delta for this block. This sequence number is constructed as described above. A HighGrpNum attribute holds the number of the highest group in the block. A NoUndo attribute is set when deltas in this block cannot be undone by a user. Each DelBlk element 904 has one of more DelGrp elements contained within it. These DelGrp elements represent the delta groups.

With this implementation, the aforementioned problem that occurs with independent add endpoint operations can be detected when two add endpoint deltas have the same block number. In this case, one new endpoint is declared the "winner" and the other endpoint is declared "out of synch."

Figure 17:
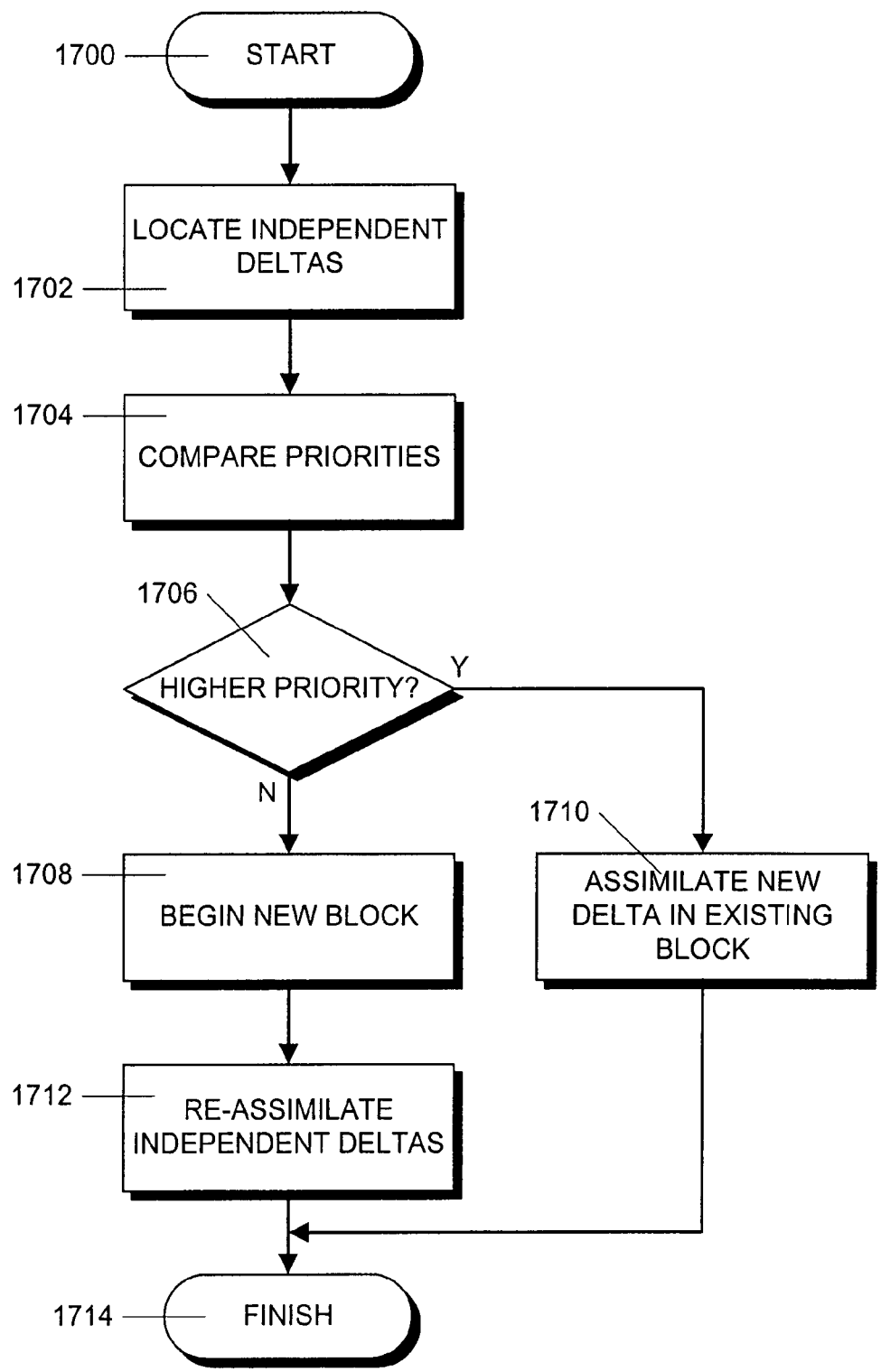
FIG. 17 is a flowchart showing the steps of an illustrative process for assimilating priority deltas.

Priority deltas are processed with the steps illustrated in FIG. 17. When a priority delta is going to be assimilated, a decision must first be made whether its priority will be ignored. As described above, the priority will be ignored when there is an independent delta with a higher priority. Therefore, the process begins in step 1700 and proceeds to step 1702 where all of the independent deltas are located. Each priority delta has an attribute that describes the state of the delta log on the endpoint that created it. This latter state is compared to the state of the delta log on the endpoint that is assimilating the delta. From this information, the independent deltas can be located.

Then in step 1704, the priorities of the independent deltas are compared. If, as determined in step 1706, none of the located independent deltas has a higher priority than the priority delta being assimilated, then the priority of the new delta will be honored. In step 1708, each priority delta will begin a new block in the delta log. Priority deltas divide the delta log into blocks such that all deltas that the priority delta depends on are assimilated into blocks earlier than deltas in the block of the priority delta. Then, in step 1712, all deltas independent of the priority delta and deltas that depend on the priority deltas are assimilated in the same block or a later block.

In particular, after the new block is created, any delta independent of the priority delta must be re-assimilated into its new position in the delta log. During the rollback phase, it is necessary to roll these deltas back in their old position and then roll them forward in the new position to maintain convergence. The process then finishes in step 1714.

Alternatively, if, in step 1706, a delta with higher priority is located, then the priority of the priority delta being assimilated will not be honored. In this case, the process proceeds to step 1710 where the delta is assimilated into the existing current block. The process then finishes in step 1714.

Figure 18:
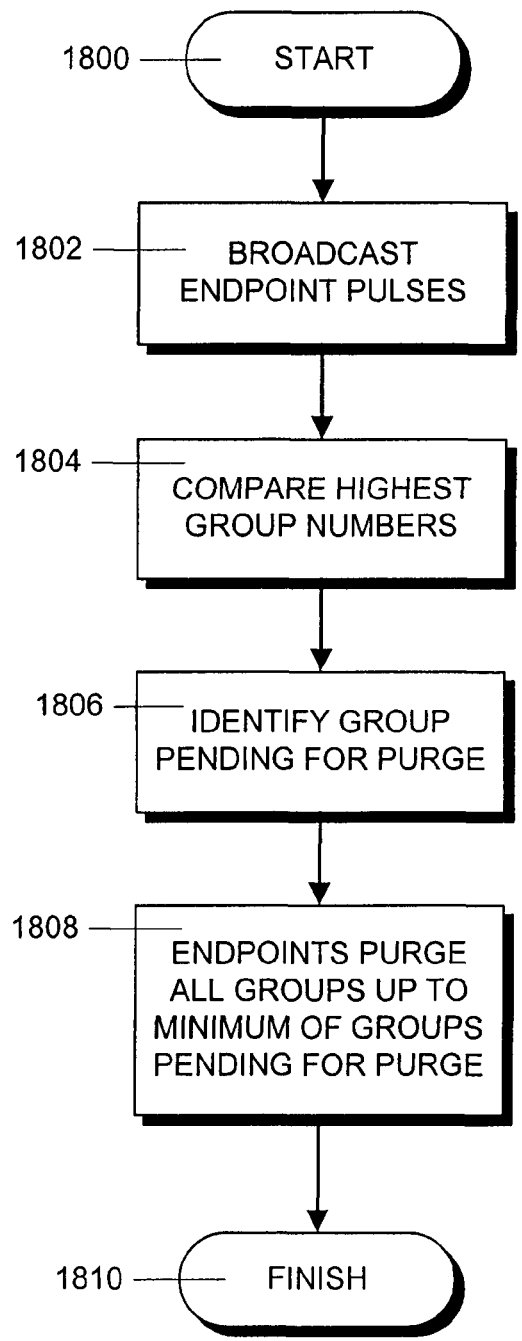
FIG. 18 is a flowchart showing the steps of an illustrative process for purging delta logs.

In order to prevent delta logs in each endpoint from continually growing in size due to new deltas being added, the logs are periodically purged. However, to prevent the premature destruction of delta information, the purging process is a two-step process. First, each endpoint declares the group that it is willing to purge (based on the highest group in each endpoint). Then, all endpoints purge deltas in groups selected by comparing the groups that the endpoints have declared that they are willing to purge. This process is illustrated in FIG. 18.

The process starts in step 1800 and proceeds to step 1802. In particular, in step 1802, all endpoints periodically broadcast purge information in transmissions called endpoint pulses. Each pulse contains information identifying the highest group number for that endpoint and information identifying a group for which a pending for purge decision has been made. Further, each endpoint pulse has dependencies in the same way that deltas have dependencies. If the dependencies are missing from the endpoint receiving the pulse, the pulse will be held just like a delta would be held. In step 1804, the highest group numbers for the endpoints are compared. In step 1806, one less than the minimum of the highest group numbers for all active endpoints is identified as the group that is pending for purge. Finally, in step 1808, each endpoint then purges up to the minimum of the pending groups of all active endpoints. The process then ends in step 1810.

In a similar manner, endpoints themselves may be purged from the endpoints XML structure depending on whether they are active or not. Each endpoint has a state that is stored in the State attribute of the EPT element in the endpoints XML structure discussed above. The State attribute can have any of the following values:

| Value | State | Definition |
|---|---|---|
| 0 | Local | The current user on his current device. Each endpoint considers itself the only local endpoint. The remaining states are in reference to this local endpoint. |
| 1 | Active | Another endpoint with which a local endpoint has decided it can synchronize. Deltas are always assimilated and executed from active endpoints if the dependencies are available. |
| 2 | New | A new endpoint is implicitly added to the shared space because an inbound delta has been received from it before it has been added to the shared space. These latter deltas are stored in the pending deltas element until the new endpoint is actually added to the shared space. |
| 6 | Disconnecting | An endpoint with which the local endpoint has ceased synchronizing. It may be necessary to execute deltas received from a disconnecting endpoint if deltas received from active endpoints depend on these deltas. |
| 7 | Disconnected | An endpoint with which the local endpoint has ceased synchronizing. An endpoint is disconnected when no deltas received from active endpoints can depend on deltas received from the disconnected endpoint. |

Figure 19:
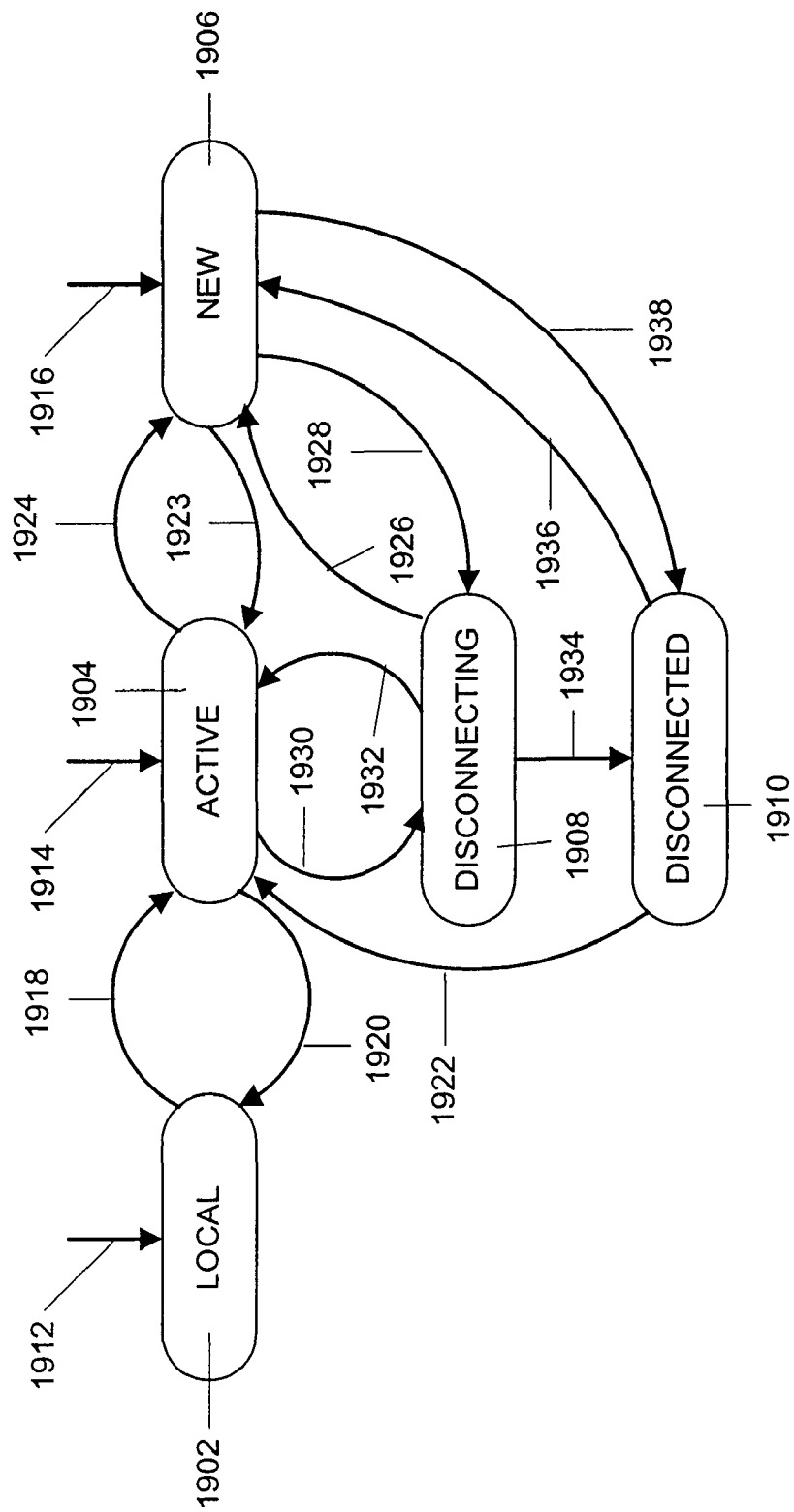
FIG. 19 is a schematic diagram representing endpoint states and transitions between the endpoint states for an endpoint.

Each endpoint moves between these defined states depending on selected conditions. A state diagram for the various states and the transitions between states is shown in FIG. 19. For example, an endpoint enters the Local state 1902 as illustrated by arrow 1912 upon the creation of a new shared space. An endpoint other than the local endpoint enters the Active state 1904, as illustrated by arrow 1914, when an AddMember delta (invitation) for that endpoint is executed or when an AddDeviceForMember delta for that endpoint (shared space fetch) is executed. Similarly, an endpoint enters the New state 1906 as indicated by arrow 1916 when a delta is received from that previously unknown endpoint.

An endpoint transitions from the Local state 1902 to the Active state 1904 as indicated by arrow 1918 when serializing of a space for a different endpoint is begun. In this case, the local endpoint is changed to the Active state 1904. Similarly, an endpoint transitions from the Active state 1904 to a Local state 1902, as indicated by arrow 1920, when a space on an endpoint is de-serialized. In that case, that endpoint is transitioned to the local state 1902. This latter transition can happen when an account is re-imported to a device on which it had previously been installed.

An endpoint can transition from the Active state 1904 to the New state 1906 as indicated by arrow 1924 when an account is re-imported to a device on which it had previously been installed. An endpoint can transition from an Active state 1904 to a Disconnecting state 1908, as indicated by arrow 1930, when the active endpoint is declared to be a "laggard" by the local endpoint. A laggard endpoint is defined as an endpoint from which no deltas have been assimilated for a specified period of time. The time check is typically performed during the purge declaration process mentioned above. This transition can also happen when a delta from the active endpoint is executed informing the local endpoint that the active endpoint deleted the space. It can further happen when a delta uninviting the active endpoint from the space is executed. Finally, this transition can be produced when a disconnect notification is received by the local endpoint informing it that the active endpoint is now disconnected.

A New state 1906 to Active state 1904 transition occurs, as indicated by arrow 1923, when an AddMember delta (invitation) for that endpoint is executed or when an AddDeviceForMember delta (shared space fetch) is executed. This transition can also happen when an AddEndpoint delta (account import) is executed.

A New state 1906 to Disconnecting state 1908 transition can occur, as indicated by arrow 1926 when a delta is received from a new endpoint whose insertion point has been marked as pending for purge. It can also occur when the local endpoint declares the insertion point of a delta from the new endpoint as "pending for purge". In addition, this transition can occur when a disconnect notification is received by the local endpoint informing it that the new endpoint is now disconnected.

A New state 1906 to Disconnected state 1910 transition can occur, as indicated by arrow 1938 when a delta is received from a new endpoint whose insertion point has purged. It can also occur when the insertion point of a delta received from by the local endpoint from the new endpoint has been purged by the local endpoint.

A Disconnecting state 1908 to Active state 1904 transition, as indicated by arrow 1932 can occur when an AddMember delta (invitation) is executed or when an AddDeviceForMember delta (shared space fetch) is executed. Such a transition can also occur when an AddEndpoint delta (account import) is executed.

A Disconnecting state 1908 to New state 1906 transition can occur, as indicated by arrow 1926 when an account is re-imported to a device on which it had previously been installed. A Disconnecting state 1908 to Disconnected state 1910 transition can occur as indicated by arrow 1934 when the insertion point of a delta received by the local endpoint from the disconnecting endpoint is purged by the local endpoint. A Disconnected state 1910 to Active state 1904 transition can occur as indicated by arrow 1922 when the local endpoint executes an AddMember delta (invitation) or an AddDeviceForMember delta (shared space fetch) or an AddEndpoint delta (account import).

A Disconnected state 1910 to a New state 1906 transition can occur as indicated by arrow 1936 when an account is re-imported to a device on which it had previously been installed.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention.

What is claimed is:

1. Apparatus for maintaining consistency of a shared space across multiple endpoints in a collaborative computer system wherein each endpoint has a local data copy and endpoints transmit data change commands to each other in order to update the local data copies, the apparatus comprising:
   a first tool in one endpoint that is responsive to user actions at the endpoint for creating a first delta container to transmit data change commands to other endpoints and for adding data change commands to the first delta container;
   a second tool in the one endpoint that is called by the first tool to add data change commands to the first delta container;
   a nesting component in the second tool for creating a second delta container, adding the second delta container to the first delta container and adding data change commands to the second delta container;
   a data change engine for executing the data change commands in the first delta container and the data change commands in the second delta container and a dynamics manager for adding the data change commands in the second delta container and undo information corresponding to the data change commands in the second delta container to the beginning of the first delta container.

2. The apparatus of claim 1 wherein at least one of the data change commands includes undo information for reversing the data change performed by the command.

3. The apparatus of claim 1 wherein the data change engine executes data change commands added to the first delta container before the second delta container was added to the first delta container after the data change commands in the second delta container are executed and added.

4. The apparatus of claim 3 wherein the data change engine, in response to the occurrence of an error during the execution of the data change commands in the first delta container, aborts the execution of the data change commands in the second delta container.

5. A method for maintaining consistency of a shared space across multiple endpoints in a collaborative computer system wherein each endpoint has a local data copy and endpoints transmit data change commands to each other in order to update the local data copies, the method comprising:
   with at least one processor:
   (a) using a first tool to create a first delta container in response to user actions at one endpoint to transmit data change commands to other endpoints;
   (b) using the first tool to add data change commands to the first delta container;
   (c) calling a second tool in the one endpoint with the first tool to add data change commands to the first delta container;
   (d) creating a second delta container with the second tool;
   (e) using the second tool to add the second delta container to the first delta container and to add data change commands to the second delta container; and
   (f) executing the data change commands in the second delta container and the data change commands in the first delta container, wherein the data change commands in the second delta container are executed before the data change commands in the first container.

6. The method of claim 5 wherein at least one of the data change commands includes undo information for reversing the data change performed by the command.

7. The method of claim 5 further comprising:
   (g) after executing the data change commands in the second delta container, adding the data change commands in the second delta container and undo information corresponding to the data change commands in the second delta container to the beginning of the first delta container.

8. The method of claim 7 wherein step (f) comprises executing the data change commands added to the first delta container before the second delta container was added after step (g) is performed.

9. The method of claim 7 further comprising:
   (h) aborting the execution of the data change commands in the second delta container upon the occurrence of an error during the execution of the data change commands in the first delta container.

10. A computer-readable storage apparatus that contains instructions which, when executed by a processor, cause the processor to perform a method, the method comprising:
   (a) using a first tool to create a first delta container in response to user actions at one endpoint to transmit data change commands to other endpoints;
   (b) using the first tool to add data change commands to the first delta container;
   (c) calling a second tool in the one endpoint with the first tool to add data change commands to the first delta container;
   (d) creating a second delta container with the second tool;
   (e) using the second tool to add the second delta container to the first delta container and to add data change commands to the second delta container; and (f) executing the data change commands in the second delta container before execution of the data change commands in the first delta container.

11. The computer-readable storage apparatus of claim 10, wherein at least one of the data change commands includes undo information for reversing the data change performed by the command.

12. The computer-readable storage apparatus of claim 10 comprising:
   (g) executing the data change commands in the first delta container; and
   (h) after executing the data change commands in the second delta container, adding the data change commands in the second delta container and undo information corresponding to the data change commands in the second delta container to the beginning of the first delta container.

13. The computer-readable storage apparatus of claim 12 wherein step (g) comprises executing the data change commands added to the first delta container before the second delta container was added after step (h) is performed.

14. The computer-readable storage apparatus of claim 12 further comprising:
   (i) aborting the execution of the data change commands in the second delta container upon the occurrence of an error during the execution of the data change commands in the first delta container.

* * * * *